(12) United States Patent  
Shashivasan et al.

(10) Patent No.: US 12,273,379 B2  
(45) Date of Patent: Apr. 8, 2025

(54) ENHANCEMENT OF DEVICE SECURITY USING MACHINE LEARNING AND SET OF RULES

(71) Applicant: SONY GROUP CORPORATION, Tokyo (JP)

(72) Inventors: Supriya Shashivasan, Bangalore (IN); Madhvesh R Sulibhavi, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 353 days.

(21) Appl. No.: 17/729,920

(22) Filed: Apr. 26, 2022

(65) Prior Publication Data

US 2023/0344863 A1  Oct. 26, 2023

(51) Int. Cl.
*H04L 9/40* (2022.01)
*G06N 20/00* (2019.01)

(52) U.S. Cl.
CPC ......... *H04L 63/1458* (2013.01); *G06N 20/00* (2019.01); *H04L 63/1416* (2013.01); *H04L 63/1425* (2013.01); *H04L 63/20* (2013.01)

(58) Field of Classification Search
CPC . H04L 63/20; H04L 63/1458; H04L 63/1416; H04L 9/40; G06N 20/00
See application file for complete search history.

(56) References Cited

U.S. PATENT DOCUMENTS 10,419,458 B2  9/2019  Moscovici et al.
10,685,293 B1 *  6/2020  Heimann ............ H04L 63/1425
10,810,695 B2 *  10/2020  Knopp ................... G06Q 40/08
11,528,294 B2 *  12/2022  Bargnesi ............. H04L 63/0263
2018/0013831 A1  1/2018  Dey et al.
(Continued)

FOREIGN PATENT DOCUMENTS

WO   WO-2021168009 A1 *  8/2021  ............ G06F 16/113

OTHER PUBLICATIONS

Nespoli, et al., "Cyberprotection in IoT environments: A dynamic rule-based solution to defend smart devices", Journal of Information Security and Applications, Elsevier, vol. 60, Aug. 2021, 13 pages.
(Continued)

*Primary Examiner* — Daniel B Potratz
*Assistant Examiner* — Faghia Telat Rana
(74) *Attorney, Agent, or Firm* — CHIP LAW GROUP

(57) ABSTRACT

A system and method for enhancement of device security using machine learning and a set of rules is provided. The system acquires log data from an electronic device configured to communicate data via a network. The system prepares a feature set based on the log data. The feature set corresponds to one or more parameters associated with a cybersecurity of the electronic device. The system determines security incidents associated with the electronic device based on at least one of an application of one or more incident detection rules and/or one or more ML models on the feature set. The system collects information associated with the determined security incidents and determines a set of measures to be implemented on the electronic device to mitigate or prevent issues associated with the security incidents. Thereafter, the system controls execution of the determined set of measures on the electronic device.

20 Claims, 10 Drawing Sheets

(56) References Cited

U.S. PATENT DOCUMENTS

| | | | |
|---|---|---|---|
| 2021/0112091 A1* | 4/2021 | Compton | H04L 63/1416 |
| 2023/0275912 A1* | 8/2023 | Shahul Hameed | H04L 63/1425 726/23 |

OTHER PUBLICATIONS

Soe, et al., "Machine Learning-Based IoT-Botnet Attack Detection with Sequential Architecture", Sensors, Multidisciplinary Digital Publishing Institute (MDPI), vol. 20, No. 16, Aug. 5, 2020, 15 pages.

Andy Marker., "How to Identify and Survive a Botnet Attack", Smartsheet, Sep. 17, 2021, 12 pages.

* cited by examiner

ENHANCEMENT OF DEVICE SECURITY USING MACHINE LEARNING AND SET OF RULES

CROSS-REFERENCE TO RELATED APPLICATIONS/INCORPORATION BY REFERENCE

None.

FIELD

Various embodiments of the disclosure relate to Internet technology and device security. More specifically, various embodiments of the disclosure relate to a system and a method for enhancement of device security using machine learning and a set of rules.

BACKGROUND

Advancements in Internet technology have led to development of an ecosystem of devices that help people in various spheres of life. The ecosystem can include devices for entertainment, security, surveillance, commerce, agriculture, banking, travel, home automation, healthcare, and the like. In a connected environment, most of such devices have ability to collect and exchange data with different entities, via Internet or other communication methods. An Internet of things (IoT) device is one such example of a device that has a specific function (e.g., a function to capture images, generate tickets, or execute a transaction) in the ecosystem and has the ability to transmit information over the Internet or other types of networks. Such devices can include or can be embedded into, for example, mobile devices, industrial equipment, environmental sensors, medical devices, cameras, Point-of-Sale (PoS) machines, and the like. Most of such devices (e.g., surveillance cameras) have limited memory and compute resources for operations of the devices. In case of a cyberattack, many such devices lack features that may typically be required to stop the attack, recover from the attack, or prevent future attacks.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for enhancement of device security using machine learning and a set of rules is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
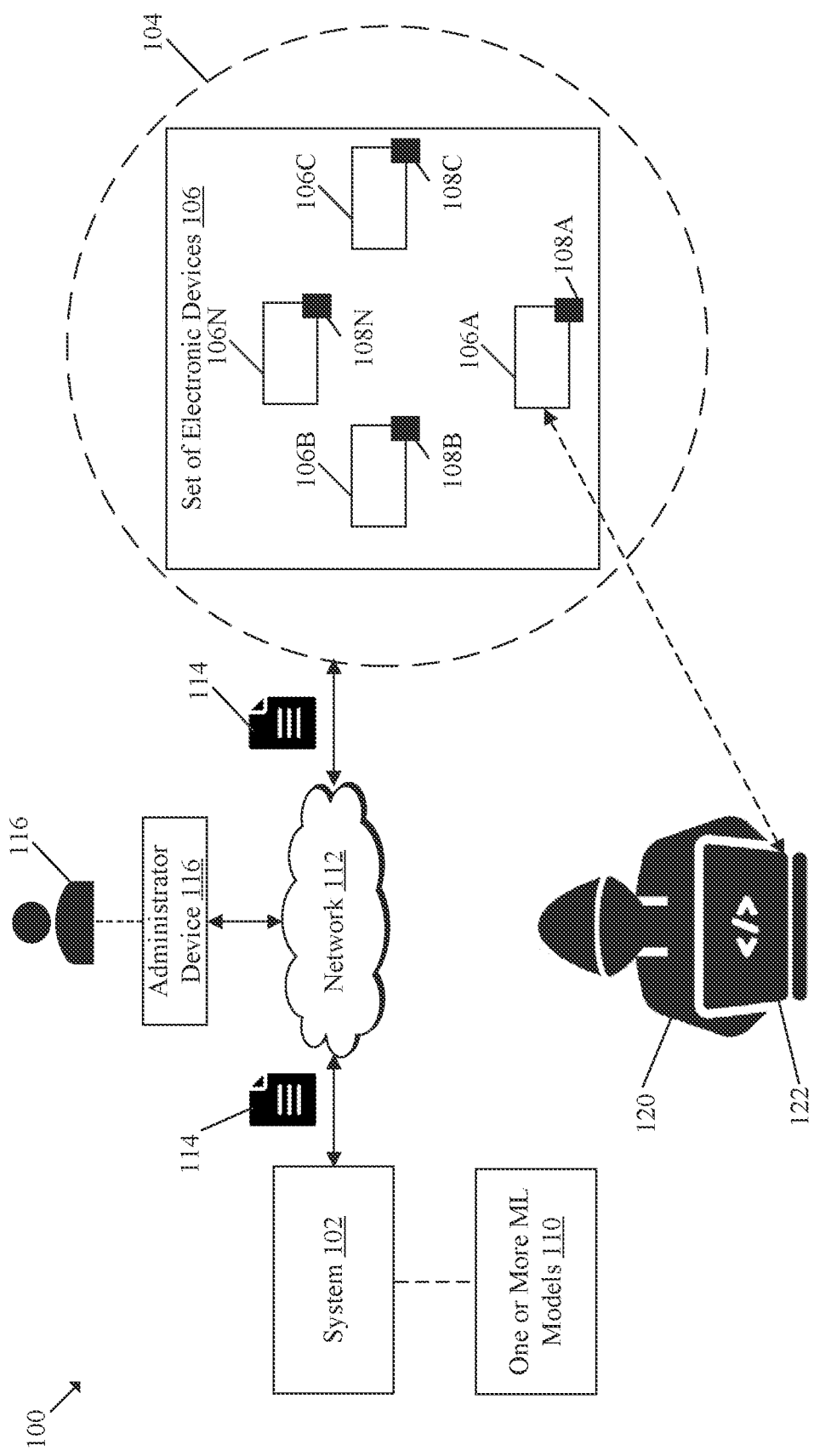
FIG. 1 is a block diagram that illustrates an exemplary network environment for enhancement of device security using machine learning and a set of rules, in accordance with an embodiment of the disclosure.

The following described implementations may be found in a disclosed system and method for enhancement of device security using machine learning and a set of rules. The method or operations included therein, when executed on the system, may help to mitigate the impact of or prevent future attempts to cause security incidents (e.g., a security attack such as a malware attack or a botnet attack) on electronic devices (such as IoT devices or non-IoT devices). The operations, when executed, may also help the electronic device to recover from any successful cyberattack. To mitigate or prevent security incidents on the electronic device, the system may be configured to acquire log data from an electronic device (such as a smart bulb or a printer) that may be configured to communicate data via a network (such as the Internet). The system may further prepare a feature set based on the log data. The feature set may correspond to one or more parameters that may be associated with a cybersecurity of the electronic device. The system may determine one or more security incidents associated with the electronic device based on at least one of an application of one or more incident detection rules on the feature set and an application of one or more Machine Learning (ML) models on the feature set. The system may collect information associated with such security incidents and may determine a set of measures to be implemented on the electronic device based on the collected information. Such measured may need to be implemented on the electronic device to mitigate or prevent issues associated with the security incidents. The system may control an execution of such measures on the electronic device.

The disclosed system provides a hybrid detection approach that may be rule-based as well as anomaly-based (uses ML model(s)). In some scenarios, the disclosed system may use ensemble-based machine learning model to determine one or more security incidents. In ensemble-based machine learning, output from the multiple ML models may be combined to enhance an accuracy of the output. Using the hybrid approach, the disclosed system may be configured to detect, mitigate, and prevent issues associated with security incidents on the electronic device. The disclosed system 102 may allow an administrator of the electronic device or the system to select incident detection rules and data that needs to be monitored for incident detection.

The disclosed system may periodically determine a set of security checks to be executed on the electronic device to enhance the security of the electronic device so that the electronic device is less vulnerable to security incidents caused by cyberattacks from malicious user(s) or malicious node(s). The set of security checks may be associated with a software associated with the electronic device, one or more ports associated with the electronic device, credentials associated with the electronic device, and the like.

In some embodiments, the disclosed system communicates with the electronic device via a software plugin installed on the electronic device. The software plugin may be a lightweight software that, when executed by a processor or circuitry, may be capable of capturing and transmitting log data from the electronic device to the system for detection, mitigation, and prevention of issues related to security incidents on the electronic device. The plugin may be used to communicate measures that the electronic device must execute to prevent, mitigate, or recover from issues caused by security incidents, such as a Denial-of-Service attack. The disclosed system handles all operations related to detection of incidents and allows the electronic device to use most of its limited compute and memory resources for usual operations of the electronic device.

In some embodiments, the disclosed system may operate as an artificial intelligence (AI) based system that may be capable of detecting any type of security incident for standalone or cloud connected electronic devices (or IoT devices). Also, the disclosed system may be capable of mitigating or preventing any type of security incident for standalone or cloud connected IoT devices and non-IoT devices. The disclosed system may automatically execute a set of scripts for detection, prevention, and mitigation of the security incidents without or with minimal human intervention. The disclosed system may be considered as an artificial intelligence (AI) based intrusion Detection System (IDS) and intrusion prevention system (IPS).

In an embodiment, the disclosed system may further include a device profiler component that may be capable of identifying a profile of the electronic device. The profile of the electronic device may be used to filter the security attacks on the electronic device. This may be useful in quick or early detection of security incidents on the electronic device.

In an embodiment, the electronic device may be a server that hosts a distributed ledger as part of a Mobility-as-a-Service (MaaS) network or may be a message broker that nodes of the MaaS network in accordance with a publish-subscribe pattern. The network of devices may include publisher nodes, subscriber nodes, a distributed ledger associated with the subscriber nodes. The disclosed system may monitor logs of data from the message broker or the server and may determine security incidents on the message broker or the server. After security incidents (e.g., a connection flood attack) are detected, the disclosed system may control execution of a set of measures on the message broker or the server to mitigate or prevent issues associated with the security incidents.

FIG. 1 is a block diagram that illustrates an exemplary network environment for enhancement of device security using machine learning and a set of rules, in accordance with an embodiment of the disclosure. With reference to FIG. 1, there is shown a network environment 100. The network environment 100 may include a system 102 and an internet of things (IoT) infrastructure 104 that may include a set of electronic devices 106. There is further shown a set of software plugins 108, one or more machine learning (ML) models 110, and a network 112. There is further shown log data 114 that may be associated with at least one electronic device of the set of electronic devices 106. With reference to FIG. 1, there is further shown an administrator 116, an administrator device 118, a malicious user 120, and a malicious user device 122. The administrator 116 may be associated with the administrator device 118, and the malicious user 120 may be associated with the malicious user device 122.

As shown, for example, the set of electronic devices 106 may include a first electronic device 106A, a second electronic device 106B, a third electronic device 106C, and a Nth electronic device 106N. The set of software plugins 108 may include a first software plugin 108A, a second software plugin 108B, a third software plugin 108C, and a Nth software plugin 108N. The first software plugin 108A may be associated with the first electronic device 106A, the second software plugin 108B may be associated with the second electronic device 106B, the third software plugin 108C may be associated with the third electronic device 106C, and the Nth software plugin 108N may be associated with the Nth electronic device 106N.

The system 102 may include suitable logic, circuitry, interfaces, and or code that may be configured to collect and monitor data of each electronic device in the IoT infrastructure 104 for security incidents. The data may include, for example, network logs, device logs, threat logs, sensor data, messages, Internet traffic data, and the like. The system 102 may determine security incidents and may control execution of measures on electronic device(s) associated with the incidents to prevent or mitigate issues associated with the security incidents. Examples of the system 102 may include, but are not limited to, an intrusion detection system, an intrusion prevention system, an attack mitigation system, a server, a computer workstation, and a mainframe machine.

The IoT infrastructure 104 may be defined as a network of devices (such as the set of electronic devices 106), technology, services, and other platform-related requirements that may be required to operate and maintain the IoT (or the set of electronic devices 106) devices present in the IoT infrastructure 104. In an embodiment, the IoT infrastructure 104 may be include several components, such as but not limited to, the network of devices (such as IoT devices, IoT gateways, edge systems, data centers) communication platform, IoT cybersecurity, and the like.

Each of the set of electronic devices 106 may include suitable logic, circuitry, and interfaces that may be configured to store the log data 114. In an embodiment, each electronic device of the set of electronic devices 106 may be embedded with at least one sensor that may be configured to capture sensor data. In an embodiment, each of the set of electronic devices 106 may communicate via the network 112 with devices inside or outside the IoT infrastructure 104. Specifically, each of the set of electronic devices 106 may be configured to transmit the captured sensor data over the network 112 to the system 102. Examples of the electronic device may include, but are not limited to, an IoT device such as a smart lighting device, a home security device (for example, a security camera, a security alarm, etc.), an activity tracker (for example, an oxygen level indicator, a blood pressure indicator, a fall detection device, etc.), an augmented reality (AR) device, a PoS device, a wearable device, a motion detection device, or an industrial security and safety device. Other examples of the electronic device may include a display device, an aroma dispenser, an electronic furniture, a lighting device, a sound reproduction device, an electronic curtain, an electronic toy, an electronic wind-chime, an electronic vase, a digital photo-frame, an electronic locker, or a network-shared printer.

In another embodiment, each of the set of electronic devices 106 may be an Internet-of-things (IoT) device. In another embodiment, each of the set of electronic devices 106 may be a message broker that may be part of a network of devices that communicate in accordance with a publish-subscribe pattern. In such an embodiment, each of the set of electronic devices 106 may host a distributed ledger as part of a Mobility-as-a-Service (MaaS) network.

In another embodiment, each of the set of electronic devices 106 may be an edge device that is part of an edge computing infrastructure. In such an embodiment, the software plugin may be installed on each edge device of the edge computing infrastructure.

Each software plugin of the set of software plugins 108, when executed by a processor or circuitry, may be configured to perform one or more operations on a host device, based on a set of instructions and rules (some of which may be set by an administrator or a user associated with the IoT infrastructure 104). For example, when executed by a processor or circuitry, each software plugin may be configured to capture log data (e.g., the log data 114) from a corresponding electronic device of the set of electronic devices 106. Each software plugin may be further configured to transmit the captured log data 114 to the system 102, via the network 112. The log data 114 may include at least one of the sensor data stored on the corresponding electronic device, network logs associated with the corresponding electronic device, and device logs associated with the corresponding electronic device. In another embodiment, the log data 114 may also include configuration files of the corresponding electronic device. In another embodiment, when executed by a processor or circuitry, each of the set of software plugins 108 may be configured to execute a set of measures or a set of security checks on the corresponding electronic device.

In an embodiment, each of such plugins may be configured to periodically capture and transmit log data 114 associated with the corresponding electronic device to the system 102. In an embodiment, each of the set of software plugins 108 may be implemented on a hardware that may integrated into a corresponding electronic device. In another embodiment, each of the set of software plugins 108 may be implemented as part of a firmware installed on a corresponding electronic device.

Each of the one or more ML models 110 may be a classifier or a regression model that may need to be trained to identify a relationship between inputs, such as features and label(s) in a training dataset and output a set of recommendations for unseen features. Each of the one or more ML models 110 may be defined by its hyper-parameters, for example, a number of weights, a cost function, an input size, a number of layers, and the like. While training, the parameters of each ML model may be tuned, and weights may be updated so as to move towards a global minimum of a cost function for the ML model. After several epochs of the training on the features in the training dataset, each of the one or more ML models 110 may be trained to output a prediction/classification result for a set of inputs. In case of classification, the prediction result may be indicative of a class label for each input of the set of inputs.

Each of the one or more ML models 110 may include electronic data, which may be implemented as, for example, a software component of an application executable on the system 102. Each of the one or more ML models 110 may rely on libraries, external scripts, or other logic/instructions for execution by a processing device, such as the system 102. Each of the one or more ML models 110 may include code that is configured to enable a computing device, such as the system 102 to perform one or more operations. Such operations may be related to, for example, a determination of security incidents and mitigation and prevention of issues related to the security incidents associated with the electronic device. Additionally, or alternatively, each of the one or more ML models 110 may be implemented using hardware, including but not limited to, a processor, a microprocessor (e.g., to perform or control performance of one or more operations), a field-programmable gate array (FPGA), or an application-specific integrated circuit (ASIC). Alternatively, in some embodiments, the each of the one or more ML models 110 may be implemented using a combination of hardware and software.

In an embodiment, each of the one or more ML models 110 may be implemented as a neural network model, such as a deep learning model. The neural network model may be defined by its hyper-parameters and topology/architecture. For example, the neural network model may be a deep neural network, hyper-parameters of which may include a number of nodes (or neurons), activation function(s), number of weights, a cost function, a regularization function, an input size, a learning rate, number of layers, and the like. Such a model may be referred to as a computational network or a system of nodes (for example, artificial neurons). For a neural network implementation, the nodes of the neural network model may be arranged in layers, as defined in a neural network topology. The layers may include an input layer, one or more hidden layers, and an output layer. Each layer may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the model. Outputs of each hidden layer may be coupled to inputs of at least one node in other layers of the neural network model. Node(s) in the final layer may receive inputs from at least one hidden layer to output a result. The number of layers and the number of nodes in each layer may be determined from the hyper-parameters, which may be set before, while, or after training the neural network model on a training dataset.

Each node of the neural network model may correspond to a mathematical function (e.g., a sigmoid function or a rectified linear unit) with a set of parameters, tunable during training of the model. The set of parameters may include, for example, a weight parameter, a regularization parameter, and the like. Each node may use the mathematical function to compute an output based on one or more inputs from nodes in other layer(s) (e.g., previous layer(s)) of the neural network model. All or some of the nodes of the neural network model may correspond to same or a different mathematical function.

In training of the neural network model, one or more parameters of each node may be updated based on whether an output of the final layer for a given input (from the training dataset) matches a correct result based on a loss function for the neural network model. The above process may be repeated for the same or a different input until a minima of loss function is achieved, and a training error is minimized. Several methods for training are known in the art, for example, gradient descent, stochastic gradient descent, batch gradient descent, gradient boost, meta-heuristics, and the like.

In certain embodiments, each of the one or more ML models 110 may be based on a hybrid architecture of multiple Deep Neural Networks (DNNs). Examples of each of the one or more ML models 110 may include, but are not limited to, a neural network model or a model based on one or more of regression method(s), instance-based method(s), regularization method(s), decision tree method(s), Bayesian method(s), clustering method(s), association rule learning, and dimensionality reduction method(s). Examples of the neural network model may include, but are not limited to, an artificial neural network (ANN), a deep neural network (DNN), a convolutional neural network (CNN), a Residual Neural Network (Res-Net), a Feature Pyramid Network (FPN), and/or a combination thereof.

The network 112 may include a communication medium through which the system 102, the set of electronic devices 106 in the IoT infrastructure 104, the administrator device 118, and the malicious user device 122 may communicate with each other. The network 112 may be a wired or wireless communication network. Examples of the network 112 may include, but are not limited to, the Internet, a Mobility-as-a-Service (MaaS) network, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

With reference to FIG. 1, there is further shown the administrator 116 of the system 102 and/or the IoT infrastructure 104. The administrator 116 may be responsible for configuration of the system 102 and/or for security of the set of electronic devices 106 in the IoT infrastructure 104. In an embodiment, the administrator 116 may be responsible for installation of the set of software plugins 108 on the set of electronic devices 106. The administrator 116 may be associated with the administrator device 118. Examples of the administrator device 118 may include, but are not limited to, a desktop computer, a laptop, a computer workstation, or a mobile device. In one or more embodiments, the administrator device 118 may include a user-end terminal device and a server communicatively coupled to the user-end terminal device. Examples of the user-end terminal device may include, but are not limited to, a mobile device, a desktop computer, a laptop, or a computer workstation.

There is further shown the malicious user 120 who may attempt to breach the security of at least one electronic device of the set of electronic devices 106 in the IoT infrastructure 104. The malicious user 120 may be associated with the malicious user device 122. Examples of the malicious user device 122 may include, but are not limited to, a desktop computer, a laptop, a computer workstation, an IoT device, a server, an edge device, or a mobile device. In one or more embodiments, the malicious user device 122 may include a user-end terminal device and a server communicatively coupled to the user-end terminal device. Examples of the user-end terminal device may include, but are not limited to, a mobile device, a desktop computer, a laptop, or a computer workstation.

In an embodiment, the system 102 may operate in two phases i.e., a set-up phase and an operational phase. In the set-up phase, the system 102 may be configured to receive an administrator input from the administrator 116 via the administrator device 118. The administrator input may be associated with an electronic device (such as the first electronic device 106A) of the set of electronic devices 106. The system 102 may be configured to select the first electronic device 106A from a network of devices in the IoT infrastructure 104 to be used for extraction of the log data 114, based on the administrator input. In an embodiment, the first administrator input may include one or more preferences for refinement of the log data 114.

In operation, the system 102 may be configured to acquire the log data 114 from the first electronic device 106A. The first electronic device 106A may be an IoT device that may be part of the IoT infrastructure 104 and may communicate via the network 112 with devices inside or outside the IoT infrastructure 104. The acquisition may be performed periodically or may be performed based on a schedule or a set rule. Specifically, the system 102 may acquire the log data 114 via a request to the first software plugin 108A installed on the first electronic device 106A. The acquired log data 114 may include at least one of, for example, sensor data stored on the first electronic device 106A, network logs associated with the first electronic device 106A, device logs associated with the first electronic device 106A, the configuration files of the first electronic device 106A, and the like.

Upon acquisition, the system 102 may refine the acquired log data 114 based on one or more preferences included in an administrator input. The refinement may include, for example, a removal of certain items from the log data 114. The system 102 may be further configured to prepare a feature set by application of a feature extractor on the refined log data. The feature set may correspond to one or more parameters associated with a cybersecurity of the first electronic device 106A. The parameters may correspond critical datapoints that must be monitored for cybersecurity. For example, the critical datapoint may include an output produced by the first electronic device 106A, IP addresses that connect to the first electronic device 106A, or messages shared with the first electronic device 106A, security threat data, malicious network traffic data, and the like.

At any time, the malicious user device 122 may execute a cyberattack to attempt to breach the security of the first electronic device 106A. Within the duration of the cyberattack or after the cyberattack, the system 102 may determine one or more security incidents that may be associated with the first electronic device 106A. Such incidents may be determined based on at least one of an application of one or more incident detection rules on the prepared feature set and/or an application of the one or more ML models 110 on the prepared feature set. The one or more security incidents may correspond to at least one of a Denial of Services (DoS) attack, a Distributed Denial of Services (DDoS) attack, a malware attack, a botnet attack, a Man-in-the-Middle (MitM) attack, a crypto-mining attack, a firmware attack, a brute force attack, and a backdoor-based attack. Details related to such security incidents are further provided, for example, in FIG. 4.

The system 102 may be further configured to collect information associated with the determined one or more security incidents. For example, the information may be collected from the first electronic device 106A and/or other devices that communicate with the first electronic device 106A. The information may include, for example, threat logs, IP addresses of devices/nodes that communicate with the first electronic device 106A, messages sent from the devices/nodes, attack classification information (e.g., malware, phishing, botnet, etc.), a level of security breach for the first electronic device 106A, a status (e.g., successful, failed, ongoing, etc.) of the security attack (i.e., cyberattack), an operational status of the first electronic device 106A, and the like. Based on the collected information, the system 102 may determine a set of measures to be implemented on the first electronic device 106A to mitigate or prevent issues associated with the determined one or more security incidents. Example of the issues may include, but is not limited to, a loss of data stored on the first electronic device 106A, a loss of configuration files stored and/or acquired on the first electronic device 106A, a corruption of the data and/or the configuration files, a failure of the first electronic to communicate (e.g., send or receive information) with certain or all devices inside or outside the IoT infrastructure 104, a damage to OS, firmware, or hardware of the first electronic device 106A, and a failure to control operations of the first electronic device 106A. In an embodiment, the determined set of measures may correspond to installation of a vulnerability patch on the first electronic device 106A. The system 102 may be configured to control an execution of the determined set of measures on the first electronic device 106A. Details about the set of measures are provided for example, in FIG. 3 and FIG. 4.

Figure 2:
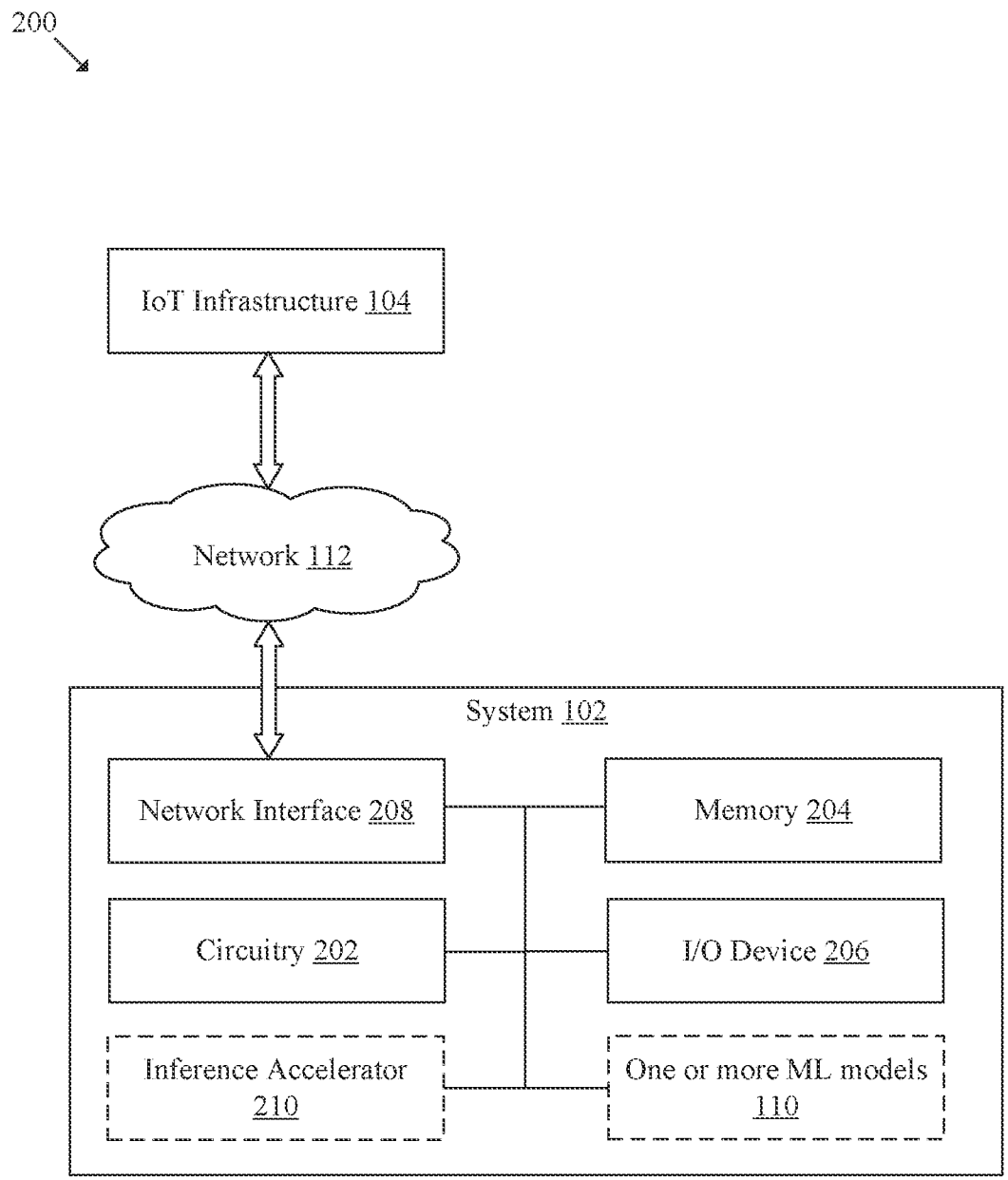
FIG. 2 is a block diagram that illustrates an exemplary system for enhancement of device security using machine learning and set of rules, in accordance with an embodiment of the disclosure.

FIG. 2 is a block diagram that illustrates an exemplary system for enhancement of device security using machine learning and set of rules, in accordance with an embodiment of the disclosure. FIG. 2 is explained in conjunction with elements from FIG. 1. With reference to FIG. 2, there is shown a block diagram 200 of the system 102. The system 102 may include circuitry 202 which may perform operations for enhancement of device security using machine learning and set of rules. The system 102 may further include a memory 204, an input/output (I/O) device 206, a network interface 208, an inference accelerator 210, and the one or more ML models 110. In an embodiment, the memory 204 may include the one or more ML models 110. The circuitry 202 may be communicatively coupled to the memory 204, the I/O device 206, the network interface 208, and the inference accelerator 210.

The circuitry 202 may include suitable logic, circuitry, and interfaces that may be configured to execute program instructions associated with different operations to be executed by the system 102. For example, some of the operations may include acquiring the log data 114, preparation of the feature set, determination of the one or more security incidents, collection of information, determination of the set of measures, and controlling of the execution of the set of measures on the first electronic device 106A. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may comprise suitable logic, circuitry, interfaces, and/or code that may be configured to store the acquired log data 114, the prepared feature set, the determined one or more security incidents, the collected information, and the determined set of features. The memory 204 may be further configured to store administrator input, the one or more incident detection rules, and the set of security checks. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive the administrator (or user) input(s) and provide an output based on the received administrator (or user) input(s). The I/O device 206 which may include various input and output devices, which may be configured to communicate with the circuitry 202. Examples of the I/O device 206 may include, but are not limited to, a display device, an audio rendering device, a touch screen, a keyboard, a mouse, a joystick, and a microphone.

The network interface 208 may include suitable logic, circuitry, and interfaces that may be configured to facilitate communication between the circuitry 202, the set of electronic devices 106 in the IoT infrastructure 104, the administrator device 118, and the malicious user device 122 via the network 112. The network interface 208 may be implemented by use of various known technologies to support wired or wireless communication of the system 102 with the network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The inference accelerator 210 may include suitable logic, circuitry, interfaces, and/or code that may be configured to operate as a co-processor for the circuitry 202 to accelerate computations associated with the operations of the one or more ML models 110. For instance, the inference accelerator 210 may accelerate the computations on the system 102 such that one or more activities may be detected in less time than what is typically incurred without the use of the inference accelerator 210. The inference accelerator 210 may implement various acceleration techniques, such as parallelization of some or all of the operations of one or more ML models 110. The inference accelerator 210 may be implemented as a software, a hardware, or a combination thereof. Example implementations of the inference accelerator 210 may include, but are not limited to, a GPU, a Tensor Processing Unit (TPU), a neuromorphic chip, a Vision Processing Unit (VPU), a field-programmable gate arrays (FGPA), a Reduced Instruction Set Computing (RISC) processor, an Application-Specific Integrated Circuit (ASIC) processor, a Complex Instruction Set Computing (CISC) processor, a microcontroller, and/or a combination thereof.

Figure 3:
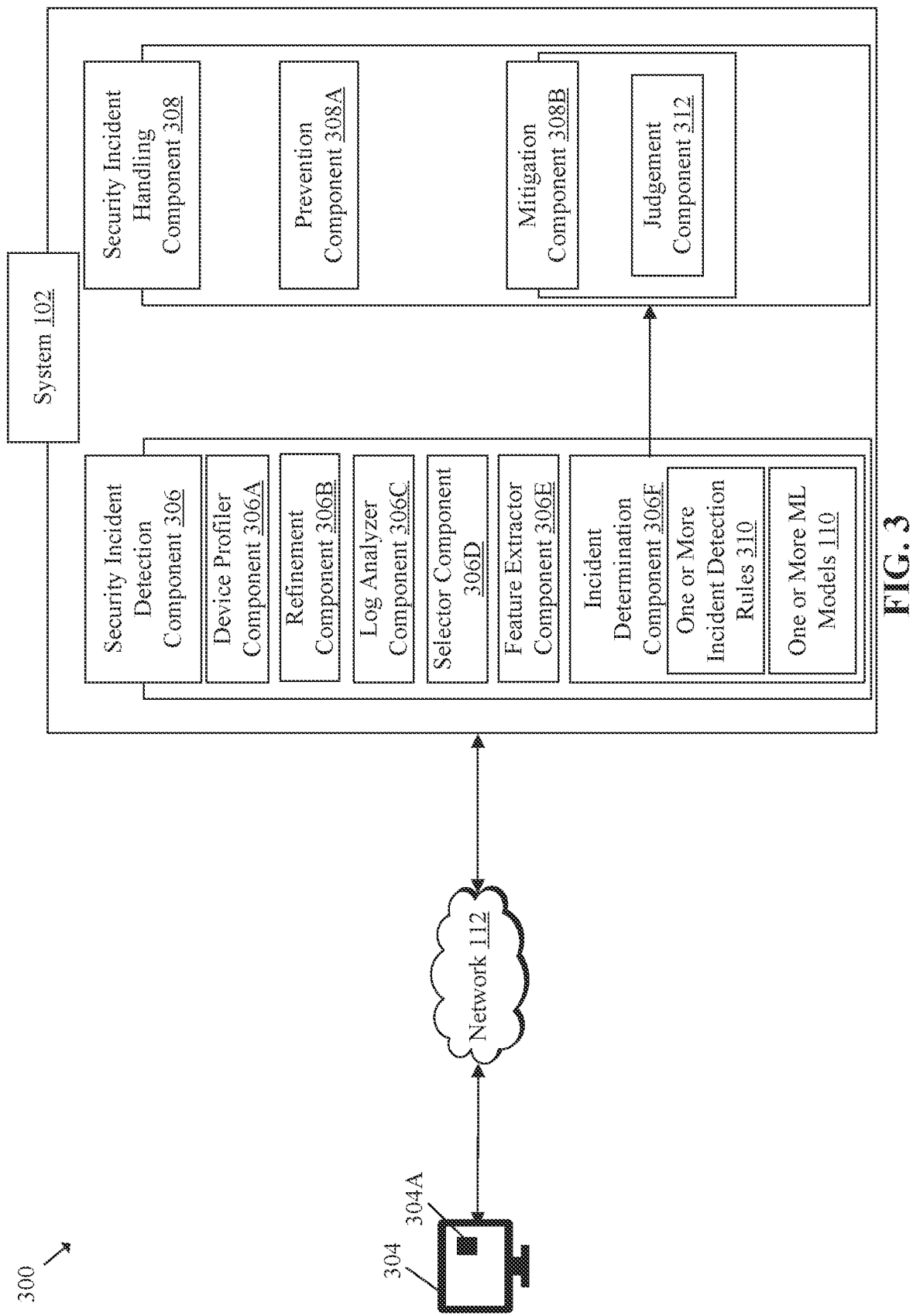
FIG. 3 is diagram that illustrates exemplary architecture of the system for enhancement of device security using machine learning and a set of rules, in accordance with an embodiment of the disclosure.

FIG. 3 is diagram that illustrates exemplary architecture of the system for enhancement of device security using machine learning and a set of rules, in accordance with an embodiment of the disclosure. FIG. 3 is explained in conjunction with elements from FIG. 1 and FIG. 2. With reference to FIG. 3, there is shown a block diagram 300 that includes a system 302. There is further shown a smart television (TV) 304 as an exemplary implementation of an electronic device of the set of electronic devices 106. Within the system 302, there is further shown a security incident detection component 306 and a security incident handling component 308.

At any time-instant, the system 302 may be configured to acquire log data from a software plugin 304A installed on the smart TV 304 via the network 112. By way of example, and not limitation, the log data may include at least one of sensor data stored on the smart TV 304, network logs associated with the smart TV 304, device logs associated with the smart TV 304, and the configuration files of the smart TV 304. Based on the reception of the log data, the system 302 may be configured to share the acquired log data with a device profiler component 306A. The device profiler component 306A may be configured to determine a profile of the electronic device (such as the smart TV). By way of example, and not limitation, the profile associated with the electronic device may be one of, but not limited to, a home device, a Supervisory control and data acquisition (SCADA) system, a network device, or a mobile device. Electronic devices such as the smart TV 304, a smart bell, a thermostat, an online camera, a voice assistant, and the like may be associated with the home device. Electronic devices such as industrial systems, industrial sensors, smart cars, medial IoT devices, industrial surveillance systems, and the like may be associated with the SCADA system. Electronic devices such as routers, switches, repeaters, extenders, hubs, modems, access points, and the like may be associated with the network devices. Electronic devices such as mobile phones, tablets, computers, laptops, smart watches, or other portable devices may be associated with mobile devices. Electronic devices such as printers, copiers, or multimedia devices may be associated with the other mobile devices. As an example, the profile associated with the smart TV 304 may be "Home Device".

After the determination of the profile of the smart TV 304, the system 302 may be configured to share the acquired log data and the determined profile of the smart TV with a refinement component 306B of the security incident detection component 306. The refinement component 306B may be configured to refine the received log data based on one or more preferences included in an administrator input. In an embodiment, the system 302 may be configured to refine the received log data based on the determined profile of the smart TV 304. The refined log data may be provided as input to a log analyzer component 306C of the security incident detection component 306. The log analyzer component 306C may be receive the refined log data and may create one or more batches of log data from the refined log data. Each of the one or more batches may be processed using one or more machine learning models to detect one or more patterns in the created one or more batches of the log data. Based on the detected one or more patterns, the system 302 may be configured to perform an early attack detection (e.g., right before the attack happens or right when the attack is performed).

In an embodiment, the system 302 may be configured to extract features from the log data, acquired from the smart TV 304 devices for early detection. The extracted features may be associated with network logs associated with the smart TV 304, device logs associated with the smart TV 304, a profile associated with the smart TV 304, and other parameters associated with the smart TV 304. As an example, the network logs associated with the smart TV 304 may include an IP address of the smart TV 304, a connected IP address count, a port number, a packet count, a number of bytes of data transmission, a duration of the connection to other IP addresses. As another example, the device logs associated with the smart TV 304 may include a type of the smart TV 304, one or more processes executing on the smart TV 304, a user credential associated with the smart TV 304, a clock associated with the smart TV 304, and a set of disk activities associated with the smart TV 304. Examples of other parameters associated with the smart TV 304 may include, but are not limited to, protocol details associated with the smart TV 304, packet flag details associated with the smart TV 304, version flag associated with the smart TV 304, a connection request time period associated with the smart TV 304.

The log analyzer component 306C may be further configured to match the created one or more batches of log data with a feature selector from training phase data. In case the match exists, the log analyzer component 306C may be configured to tag the log data and share the tagged logged with a selector component 306D.

The selector component 306D may be configured to select one of a first method or a second method for the determination of the one or more security incidents associated with the smart TV 304. The first method may be used to determine the one or more security incidents associated with the smart TV 304 based on an application of one or more incident detection rules on the feature set. The second method may be used to determine the one or more security incidents associated with the smart TV 304 based on an application of one or more Machine Learning (ML) models on the feature set.

In an embodiment, the selector component 306D may be further configured to detect an attack category based on early detection of the security attack. The detected categories may be one of a host-based attack, a login-based attack, a port scan attack, a network-based attack, and a service exploitation attack.

After the selection of the first method or the second method, the system 102 may be configured to share the acquired log data with a feature extractor component 306E of the security incident detection component 306. The feature extractor component 306E may include a feature extractor that may be configured to prepare a feature set. The feature set may correspond to one or more parameters associated with the cybersecurity of the smart TV 304. Specifically, each feature included in the feature set may correspond to at least one or more parameters associated with the cybersecurity of the smart TV 304.

Based on the preparation of the feature set, the system 102 may be configured to transmit the prepared feature set to incident determination component 306F. In an embodiment, the incident determination component 306F may be configured to determine one or more security incidents associated with the smart TV 304 based on application of one or more incident detection rules 310 on the feature set. The one or more incident detection rules 310 may be set by an administrator or a user of the system 302, the IoT infrastructure 104, or the smart TV 304. To determine such security incidents, the system 302 may be configured to extract a feature from the feature set and determine whether or not the extracted feature matches one of a set of attack log rules included in the one or more incident detection rules 310. In case the extracted feature matches one of the set of attack log rules, the security incident (e.g., a security attack) may be determined to have occurred with the smart TV 304. By way of example, and not limitation, the one or more security incidents may correspond to at least one of a DoS attack, a DDoS attack, a malware attack, a botnet attack, a MitM attack, a crypto-mining attack, a firmware attack, a brute force attack, and a backdoor-based attack.

In accordance with an embodiment, the one or more incident detection rules 310 may include a set of normal log rules (not shown). In case the extracted feature matches one of the set of normal log rules, the smart TV 304 may be determined to be functioning normally (i.e., that the security incident has not been determined).

In another embodiment, the incident determination component 306F may be configured to determine the one or more security incidents associated with the smart TV 304 based on an application of the one or more ML models 110 on the prepared feature set. Specifically, the system 302 may be configured to extract a feature from the from the feature set. The system 302 may be further configured to determine a feature selector that may be associated with the extracted feature. The feature selector may be determined from training phase data for the one or more ML models 110. The system 102 may be further configured to select the one or more ML models 110 from among a set of ML models based on model performance criteria and the feature selector. Details about the training phase data and the set of ML models are provided, for example, in FIG. 8.

The application of the one or more ML models 110 on the feature set may include an operation to input the feature set to the one or more ML models 110 and an operation to extract a classification result as output of the one or more ML models 110. The classification result may indicate whether the one or more security incidents have occurred or are about to occur on the smart TV 304.

Based on the determination of the security incident, the system 302 may be configured to transfer the control to the security incident handling component 308. The security incident handling component 308 may include a prevention component 308A, and a mitigation component 308B. The prevention component 308A may be activated if the classification result indicates that the one or more security incidents are about to occur on the smart TV 304. The mitigation component 308B may be activated if the classification result indicates that the one or more security incidents have occurred on the smart TV 304.

In case the prevention component 308A is activated (i.e., when the classification result indicates that the one or more security incidents are about to occur on the smart TV 304), the system 302 may be configured to control the smart TV 304 to execute one or more vulnerability scans on the smart TV 304. The control may be performed via the software plugin 304A installed on the smart TV 304. Based on the execution of the one or more vulnerability scans on the smart TV 304, the system 302 may be configured to receive vulnerability scan results from the smart TV 304. In accordance with an embodiment, the system 102 may be further configured to determine a set of security checks to be performed on the smart TV 304 based on the received vulnerability scan results. Details about the set of security checks are provided, for example, in FIG. 5.

In case the mitigation component 308B is activated (i.e., when the classification result indicates that the one or more security incidents have occurred on the smart TV 304), then the system 302 may be configured to collect information associated with the determined one or more security incidents. As an example, the collected information may include threat logs, IP addresses of devices/nodes that communicate with the first electronic device 106A, messages sent from the devices/nodes, attack classification information (e.g., malware, phishing, botnet, etc.), a level of security breach for the first electronic device 106A, a status (e.g., successful, failed, ongoing, etc.) of the security attack (i.e., cyberattack), an operational status of the first electronic device 106A, and the like. As another example, the collected information may include a type of each of the one or more security incidents, a port associated with each of the one or more security incidents, an IP address associated with each of the one or more security incidents, a time associated with each of the one or more security incidents, packet data associated with each of the one or more security incidents, and the like. In an embodiment, the information may be collected based on analysis of the acquired log data from the smart TV 304.

Based on the collected information, the system 302 may be configured to determine a set of measures to be implemented on the smart TV 304 to mitigate issues associated with the determined one or more security incidents. In an embodiment, the mitigation component 308B may include a judgment module 312 that may be configured to determine the set of measures to be implemented on the smart TV 304 based on the collected information.

The system 302 may be further configured to control an execution of the determined set of measures on the smart TV 304. By way of an example, and not limitation, the set of measures may correspond to installation of a vulnerability patch on the smart TV 304. The vulnerability patch may be software program (include computer-executable code) that may be installed on the smart TV 304 via the software plugin 304A. The vulnerability patch, when installed on the smart TV 304, may mitigate the determined one or more security incidents on the smart TV 304. In another embodiment, the vulnerability patch, when installed on the smart TV 304, may prevent security incidents (same as or similar to the detected ones) on the smart TV 304 in future.

Figure 4:
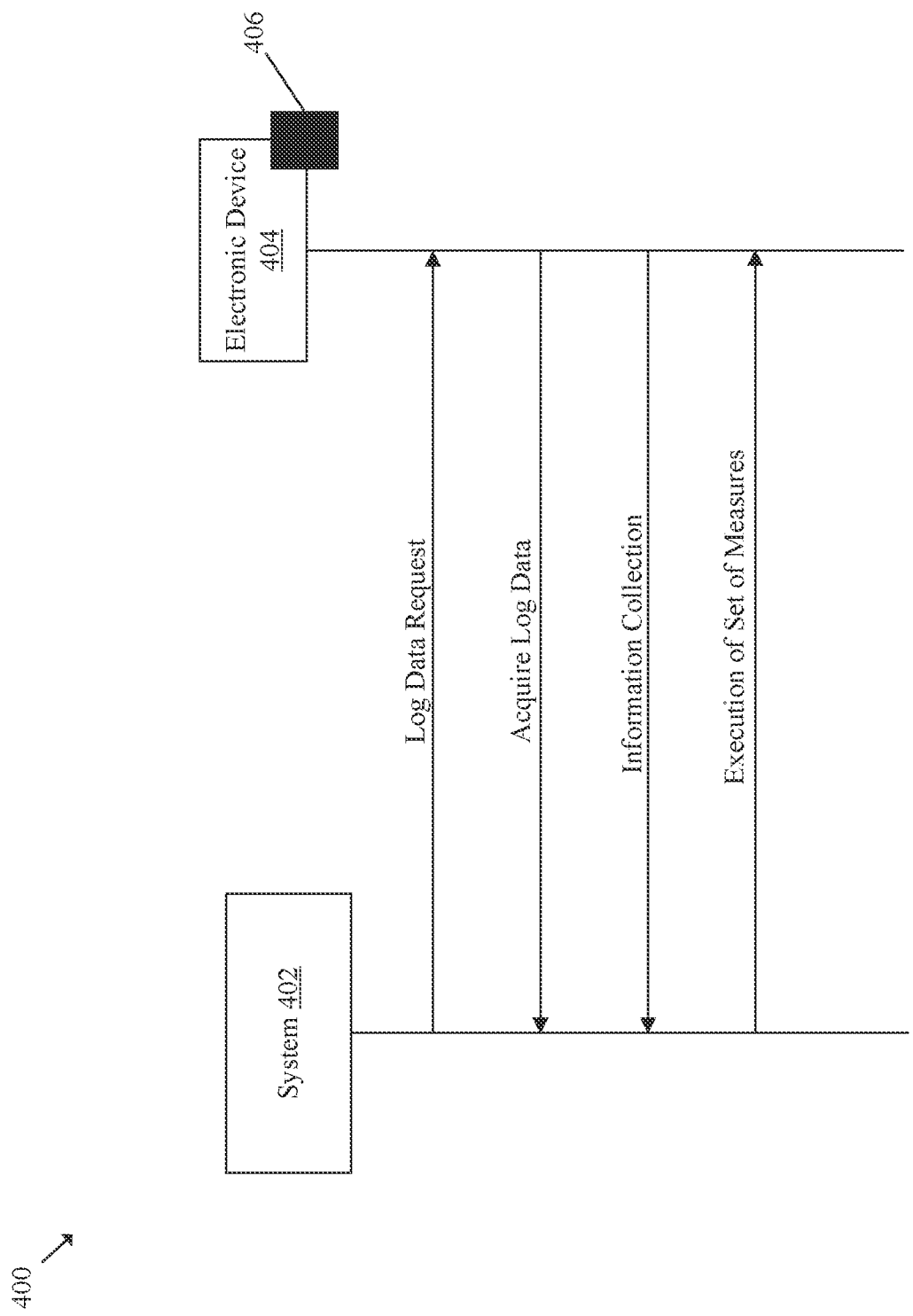
FIG. 4 is a diagram that illustrates an exemplary communication between the system and the electronic device for enhancement of device security using machine learning and a set of rules, in accordance with an embodiment of the disclosure.

FIG. 4 is a diagram that illustrates an exemplary communication between the system and the electronic device for enhancement of device security using machine learning and a set of rules, in accordance with an embodiment of the disclosure. FIG. 4 is explained in conjunction with elements from FIG. 1, FIG. 2, and FIG. 3. With reference to FIG. 4, there is shown a block diagram 400. There is further shown a system 402, an electronic device 404, and a software plugin 406. The electronic device 404 may be an Internet-of-things (IoT) device that may be part of an IoT infrastructure and communicates via a network with devices inside or outside the IoT infrastructure. The devices that are inside the IoT infrastructure may correspond to other electronic devices present in the IoT infrastructure. Devices that are outside the IoT infrastructure may correspond to devices that are not a part of the IoT infrastructure but are still communicatively coupled to the electronic device 404. Example of devices outside the IoT infrastructure may include, but is not limited to, the system 402, the administrator device 118, and the malicious user device 122.

In an embodiment, the system 402 may be configured to transmit a log data request to the electronic device 404 via the network 112. Specifically, the system 402 may be configured to transmit the log data request to the software plugin 406 installed on the electronic device 404, via the network 112. The software plugin 406 may be a custom-made plugin that may be specially designed for the electronic device 404.

Based on the reception of the log data request, the software plugin 406, when executed by a processor or circuitry, may be configured to capture the log data. By way of example, and not limitation, the captured log data may include at least one of sensor data stored on the electronic device 404, network logs associated with the electronic device 404, device logs associated with the electronic device 404, and configuration files of the electronic device 404.

In an embodiment, the sensor data stored on the electronic device 404 may correspond to data captured by the sensor embedded in the electronic device 404. For example, if the electronic device 404 corresponds to a camera, then the sensor data may correspond to one or more images captured by a camera sensor embedded in the camera. The network logs associated with the electronic device 404 may include unexpected connections associated with the electronic device 404, repeated connections associated with the electronic device 404, connections of the electronic device 404 with unsecure wireless networks, connections requesting authentication credentials from the electronic device 404, connections associated with the electronic device 404 from unexpected (or unfamiliar) locations, Domain Name System (DNS) changes, traffic spikes, a time to live (TTL) ping request time out, a traffic volume, packet header information, port logs, firewall logs, proxy logs, executable files in the network, payload logs, and the like. The device logs associated with the electronic device 404 may include, but are not limited to, CPU usage logs, application server logs, malware signatures, logs related to host files, and operating system logs. The configuration files of the electronic device 404 may be associated with the configuration of the electronic device 404.

After capturing the log data, the software plugin 406 may be configured to transmit the captured log data to the system 402 via the network 112. In another embodiment, the software plugin 406 may be configured to periodically capture and transmit the log data to the system 402 via the network 112. For example, the software plugin 406 may be configured to capture and transmit the log data to the system 402 periodically after an interval of 15 minutes. The interval may be configured by an administrator of the electronic device 404 or the system 402.

The system 402 may be configured to acquire the log data from the software plugin 406 via the network 112. Based on the acquired data, the system 402 may be configured to refine the log data. In accordance with an embodiment, the refinement may be performed on the electronic device 404 and the refined log data may be transmitted to the system 102. In accordance with an embodiment, the log data may be refined based on one or more preferences of an administrator (e.g., IT or Network admin) of the electronic device 404 or the system 402. The one or more preferences may be included in the administrator input that may be received during the setup phase of the system 402. In an embodiment, the one or more preferences may be associated with one or more parameters associated with the cybersecurity of the electronic device 404.

In an embodiment, the system 402 may be configured to refine the log data by performing one or more data cleaning operations to remove incorrect data, corrupted data, incorrectly formatted data, irrelevant data, duplicate data, or incomplete data from the acquired log data. The detailed implementation of the aforementioned one or more data cleaning operations may be known to one skilled in the art; and therefore, a detailed description of such operations has been omitted from the disclosure for the sake of brevity.

Based on the refinement of the acquired log data, the system 402 may be configured to prepare a feature set. In an embodiment, the system 402 may be configured to apply a feature extractor on the refined log data to prepare the feature set. The feature set may correspond to one or more parameters associated with the cybersecurity of the electronic device 404. The one or more parameters may correspond to critical datapoints that must be monitored for the cybersecurity of the electronic device 404. By way of example, and not limitation, the one or more parameters may include the sensor data associated with the electronic device 404, the IP addresses of devices that may be connected to the electronic device 404, messages shared to and from the electronic device 404, threat data associated with the electronic device 404, traffic data associated with the electronic device 404, and the like.

The system 402 may be configured to determine one or more security incidents associated with the electronic device 404. The determined one or more security incidents may correspond to at least one of a DoS attack, a DDoS attack, a malware attack, a botnet attack, a MitM attack, a crypto-mining attack, a firmware attack, a brute force attack, and a backdoor-based attack. The DoS attack may be a type of a security attack in which the malicious user 120 aims to render the electronic device 404 unavailable to its intended users by interrupting normal functioning of the electronic device 404. The DDoS attack may be a type of security attack in which more than one malicious user (including the malicious user 120) may aim to render the electronic device 404 unavailable to its intended users by interrupting normal functioning of the electronic device 404. The malware attack may be a type of security attack in which the malicious user 120 may install a malicious software (known as a malware) on the electronic device 404 without authorization from the administrator of the electronic device 404 to gain access to personal information or to damage the electronic device 404. Most malware attacks may be described based on a type of malware that may be installed on the electronic device 404. Different types of the malware may include, for example, a virus, a worm, a trojan, a hybrid of virus, or a worm. Different types of malware attacks may include, for example, an adware, a spyware, a ransomware, or a combination thereof.

The botnet attack may be a security incident that may be carried out by a group of internet-connected devices controlled by the malicious user 120. The botnet attack may be further divided into a command and control (C&C) based botnet attack, a telnet-based botnet attack, an internet relay chat (IRC) based botnet attack, a peer-to-peer (P2P) based botnet attack, a domain-based botnet attack, and an IoT based botnet attack. Details above the above-mentioned botnet attacks are known in the art. Therefore, a detailed description about the above-mentioned botnet attacks have been omitted for the sake of brevity.

The MitM attack may be an eavesdropping attack that may allow the malicious user 120 to eavesdrop in a communication between two targets. The attack takes place in between two legitimately communicating hosts, allowing the malicious user 120 to "listen" to a conversation they should normally not be able to listen to. The MitM attack may be further divided into several types, such as but not limited to, an Internet Protocol (IP) spoofing based MitM attack, a domain name system (DNS) spoofing based MitM attack, a Hypertext Transfer Protocol Secure (HTTPS) spoofing based MitM attack, a Secure Sockets Layer (SSL) hijacking based MitM attack, an electronic mail (Email) hijacking based MitM attack, a Wireless Fidelity (Wi-Fi) eavesdropping based MitM attack, and a cookie theft based MitM attack. Details above the above-mentioned MitM attacks are known in the art. Therefore, a detailed description about the above-mentioned MitM attacks have been omitted for the sake of brevity.

The crypto-mining attack may be a security attack in which the malicious user 120 uses the computational power of the electronic device 404 to run computer-executable code to mine cryptocurrency or other digital assets. The firmware attack may be a security attack in which a malicious code is pushed into a code associated with the electronic device 404 by the malicious user 120. The brute force attack may be a cryptographic hack in which the malicious user 120 may use trial-and-error to guess possible combinations for passwords that may be used for logins to gain access of the electronic device 404. The backdoor-based attack may be a security incident in which the malicious code is pushed into a code associated with the electronic device 404 using a backdoor. The backdoor may be defined as a vulnerability in firmware/hardware of the electronic device 404 that allows certain individuals (such as the malicious user 120) into the electronic device 404, without a permission of the user of the electronic device 404.

In an embodiment, the system 402 may be configured to determine one or more security incidents by an application of one or more incident detection rules on the feature set. For example, system 402 may be configured to extract a feature from the feature set. The application of the one or more incident detection rules for the determination of the one or more security incidents may include a determination that the extracted feature matches one of a set of attack log rules included in the one or more incident detection rules. Details about the one or more incident detection rules are provided, for example, in FIG. 3.

In another embodiment, the system 402 may be configured to determine one or more security incidents by an application of one or more ML models 110 on the feature set. For example, the system 402 may be configured to extract a feature from the feature set. The system 402 may determine a feature selector that may be associated with the extracted feature from training phase data for the one or more ML models 110. The system 402 may be further configured to select the one or more ML models 110 from among a set of ML models based on model performance criteria and the feature selector. The model performance criteria may be based on a time taken by the corresponding ML model to generate the output. In another embodiment, the model performance criteria may be associated with an accuracy of the corresponding model. The application of the one or more ML models 110 on the feature set may include an operation to input the feature set to the one or more ML models 110 and an operation to extract a classification result as output of the one or more ML models 110. The classification result may indicate whether the one or more security incidents have occurred or are about to occur on the electronic device 404.

By way of example, and not limitation, if the determined one or more security incidents correspond to a botnet attack, then the system 402 may be configured to utilize network logs associated with C&C connections, executable files, and ports may be utilized to determine the botnet attack. Along with the network logs, the system 402 may be further configured to utilize malware signatures, and host files changes included in the device logs to determine the botnet attack. As another example, the system 402 may utilize network logs that includes Network statistics, unusual traffic spikes, TTL ping request timing out, Traffic volume, Packet header information, and "503" response code for service outages to determine a DoS or DDoS attack. Along with the network logs, the system 402 may also utilize the device logs associated with CPU usage, and application server errors to determine the DoS or DDoS attack.

Based on the determination of such security incidents, the system 402 may collect information associated with such security incidents. As an example, the collected information may include threat logs, IP addresses of devices/nodes that communicate with the electronic device 404, messages sent from the devices/nodes, attack classification information (e.g., malware, phishing, botnet, etc.), a level of security breach for the first electronic device 106A, a status (e.g., successful, failed, ongoing, etc.) of the security attack (i.e., cyberattack), an operational status of the first electronic device 106A, and the like. As another example, the collected information may include a type of each of the one or more security incidents, a port associated with each of the one or more security incidents, an IP address associated with each of the one or more security incidents, a time associated with each of the one or more security incidents, packet data associated with each of the one or more security incidents, and the like.

In an embodiment, the system 402 may be configured to collect the information from the software plugin 406. Based on the collected information, the system 402 may be configured to determine a set of measures to be implemented on the electronic device 404 to mitigate or prevent issues associated with the determined one or more security incidents. In an embodiment, the set of measures may correspond to installation of a vulnerability patch on the electronic device 404. In another embodiment, the set of measure may depend on the type of security attack.

By way of example, and not limitation, if the security incident corresponds to a DoS attack, then the set of measures may include an operation to block IP address of the malicious user device 122 associated with the malicious user 120, an operation to set a rate limit for incoming connections to the electronic device 404, and an operation to blacklist IP address of the malicious user device 122 to perform DoS filtering. As another example, if the security incident corresponds to a DDoS attack, then the set of measures may include an operation to block DDoS traffic on the electronic device 404, an operation to terminate undesired processes on the electronic device 404, an operation to terminate unwanted connections on the electronic device 404, an operation to reroute DDoS traffic to a black hole, an operation to route traffic on scrubbing services and products, and an operation to notify Internet service providers (ISP) and executives about the DDoS attack.

In case the security incident corresponds to a Botnet attack, then the set of measures may include an operation to isolate the electronic device 404 from other devices in the IoT infrastructure, an operation to cease a network connection to the electronic device 404, an operation to eradicate the malware on the electronic device 404, an operation to update the software on the electronic device 404, an operation to limit the functionality of the electronic device 404, and an operation to save a signature of the malware. In case the security incident corresponds to an MitM attack, then the set of measures may include an operation to isolate the MitM connection, an operation to use Hypertext Transfer Protocol Secure (HTTPS) for connection, and an operation to trace the steps to eradicate the MitM connection. As another example, if the security incident corresponds to a malware attack, then the set of measures may include an operation to isolate all the connections and disable all services associated with the electronic device 404, an operation to isolate the electronic device 404 to prevent spread of the malware, eradicate malware, rebuild one or more incident detection rules, rebuild firewall rules, and recover data. In an embodiment, the prevention of the spread of the malware may be done by executing the malware in a sandbox, analyzing the malware in forensics, requesting system patch, updating firewall rules, and adjusting one or more incident detection rules. To eradicate the malware, the malware may be quarantined and then removed from the electronic device 404.

The system 402 may be configured to control an execution of the determined set of measures on the electronic device 404. Specifically, the system 402 may be configured to control the software plugin 406 installed on the electronic device 404 to execute the determined set of measures on the electronic device 404.

Figure 5:
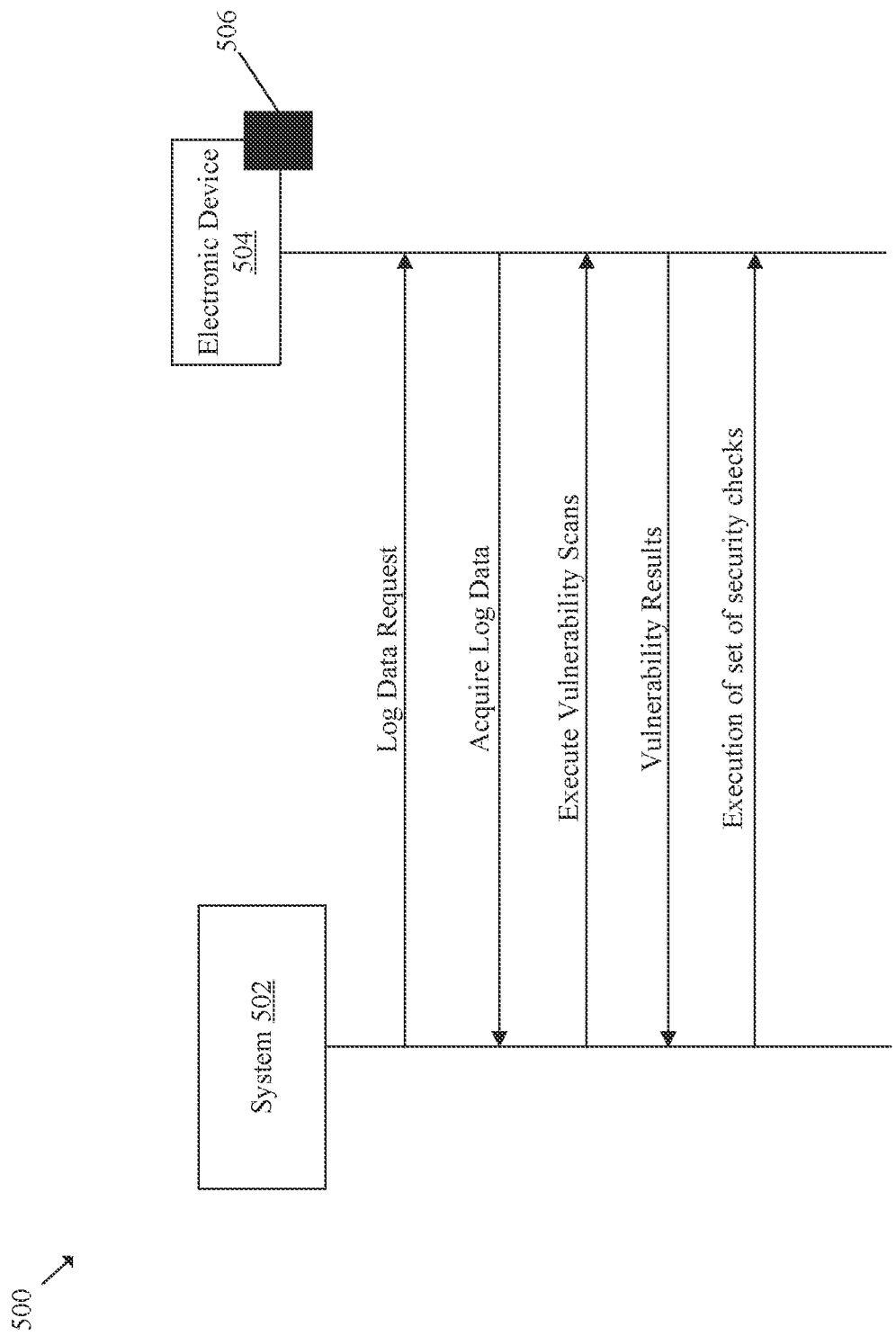
FIG. 5 is a diagram that illustrates an exemplary communication between a system and an electronic device for prevention of security incidents on the electronic device, in accordance with an embodiment of the disclosure.

FIG. 5 is a diagram that illustrates an exemplary communication between a system and an electronic device for prevention of security incidents on the electronic device, in accordance with an embodiment of the disclosure. FIG. 5 is explained in conjunction with elements from FIG. 1, FIG. 2, FIG. 3, and FIG. 4. With reference to FIG. 5, there is shown a block diagram 500. There is further shown a system 502, an electronic device 504, and a software plugin 506. The electronic device 504 may be an IoT device that may be part of an IoT infrastructure and communicates via a network with devices inside or outside the IoT infrastructure.

In an embodiment, the system 502 may be configured to transmit a log data request to the electronic device 504 via the network 112. Based on the reception of the log data request, the electronic device 504 may be configured to transmit the log data to the system 502. The log data may include at least one of sensor data stored on the electronic device 504, network logs associated with the electronic device 504, device logs associated with the electronic device 504, and configuration files of the electronic device 504.

The system 502 may be configured to acquire the log data from the electronic device 504 via the network 112. The system 502 may be configured to prepare a feature set. The feature set may correspond to one or more parameters that may be associated with a cybersecurity of the electronic device 504. The one or more parameters may correspond to critical datapoints that must be monitored for the cybersecurity of the electronic device 504. Details about preparation of the feature set are provided, for example, in FIG. 3 and FIG. 4.

In an embodiment, the system 502 may be configured to determine one or more security incidents by an application of one or more incident detection rules on the feature set. In another embodiment, the system 502 may be configured to determine one or more security incidents by an application of one or more ML models 110 on the feature set. Details about the determination of the one or more security incidents are provided, for example, in FIG. 3, and FIG. 4.

In an embodiment, the determined one or more security incidents may indicate that the cyberattack performed by a malicious node failed to breach a security of the electronic device 504. Based on such determination, the system 502 may be configured to control the electronic device 504 to execute one or more vulnerability scans on the electronic device 504. The system 502 may be configured to control the software plugin 506 to execute one or more vulnerability scans on the electronic device 504. Each of the one or more vulnerability scans may correspond to a software program that may be intended to proactively identify vulnerabilities in the electronic device 504. The identified vulnerabilities may be a cause of a breach in the security of the electronic device 504. Therefore, such vulnerabilities must be fixed.

Based on the execution of the one or more vulnerability scans on the electronic device 504, the system 502 may be configured to receive vulnerability scan results. The vulnerability scan results may indicate the identified vulnerabilities in the electronic device 504. The system 502 may be configured to determine a set of security checks to be performed on the electronic device 504. The set of security checks may be determined based on at least one of the received vulnerability scan results, a security intelligence database, and one or more policies associated with the system or the electronic device 504. The security intelligence database may be database of security vulnerabilities and methods to fix such vulnerabilities. The one or more policies (or regulations) associated with the system 502 (or the electronic device 504) may be associated with the security and information protection of the system 502 (or the electronic device 504). In an embodiment, the system 502 may be configured to determine the set of security checks based on publicly disclosed information on security vulnerabilities and exposures, and other similar libraries. An example of such publicly disclosed information is Mitre® Common Vulnerabilities and Exposures (CVE®).

In an embodiment, the set of security checks may be associated with at least one of a software associated with the electronic device 504, one or more ports associated with the electronic device 504, and credentials associated with the electronic device 504. The system 502 may be configured to control the electronic device 504 to execute a set of security checks on the electronic device 504 to prevent the one or more security incidents. By way of example, and not limitation, the electronic device 504 may have been actively using an outdated version of the software with vulnerabilities. In such a case, the set of security checks, when executed, on the electronic device 504 may update the software associated with the electronic device 504 to a latest available version (includes patches/fixes for the vulnerabilities). As another example, a port of the electronic device 504 may be open. In such a scenario, the set of security checks, when executed, on the electronic device 504 may close the port of the electronic device 504. As another example, the electronic device 504 may have been using a default or commonly known credentials. In such a case, the set of security checks, when executed, on the electronic device 504 may change the credentials associated with the electronic device 504 and may inform the administrator about the change.

Figure 6:
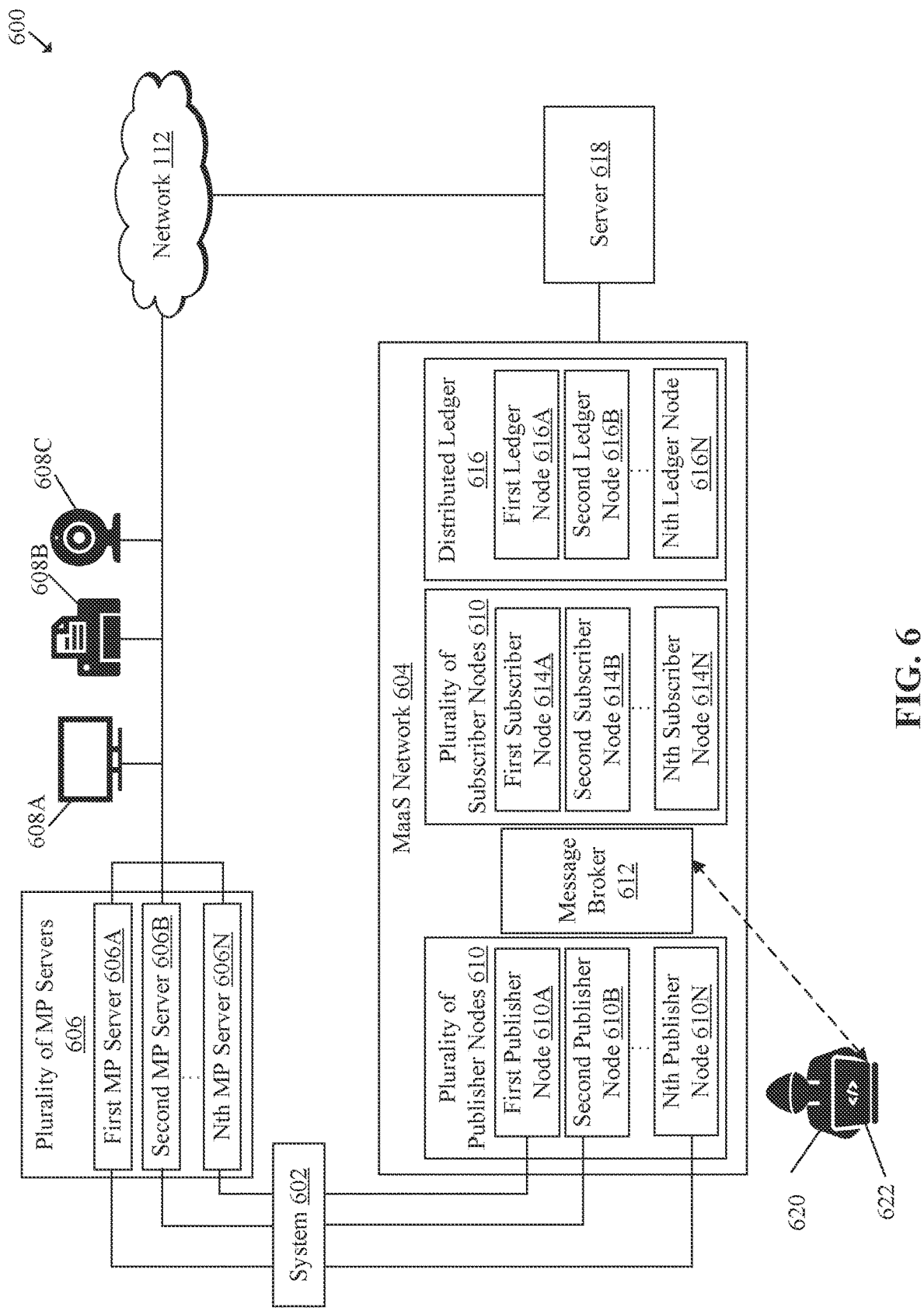
FIG. 6 is diagram that illustrates exemplary network for enhancement of security of a message broker in a Mobility-as-a-Service (MaaS) network, in accordance with an embodiment of the disclosure.

FIG. 6 is diagram that illustrates exemplary network enhancement for enhancement of security of a message broker in a Mobility-as-a-Service (MaaS) network, in accordance with an embodiment of the disclosure. FIG. 6 is explained in conjunction with elements from FIG. 1, FIG. 2, FIG. 3, FIG. 4, and FIG. 5. With reference to FIG. 6, there is shown an exemplary network environment 600. The network environment 600 may include a system 602, a MaaS network 604, and a plurality of mobility provider (MP) servers 606. The plurality of MP servers 606 may include a first MP server 606A, a second MP server 606B, and an Nth MP server 606N. There is further shown a set of electronic devices 608 that may include a first electronic device 608A, a second electronic device 608B, . . . , and an Nth electronic device 608N, respectively.

The MaaS network 604 may be associated with a publish-subscribe pattern. As shown, for example, the MaaS network 604 includes a plurality of publisher nodes 610, a message broker 612, and a plurality of subscriber nodes 614. The plurality of publisher nodes 610 may include a first publisher node 610A, a second publisher node 610B, and an Nth publisher node 610N. The plurality of subscriber nodes 614 may include a first subscriber node 614A, a second subscriber node 614B, and an Nth subscriber node 614N. The MaaS network 604 may further include a distributed ledger 616 that may include a first ledger node 616A, a second ledger node 616B, and a Nth ledger node 616N to record transactions associated with various mobility services. Further, there is shown a server 618 and a malicious user 620 who may be associated with a malicious device 622.

The MaaS network 604 may support a standard specification for communication. The MaaS network 604 may include the plurality of publisher nodes 610, plurality of subscriber nodes 614, and the message broker 612 to communicate transaction messages from the plurality of publisher nodes 610 to the plurality of subscriber nodes 614, in accordance with a publish-subscribe network protocol, such as but not limited to, a Message Queuing Telemetry Transport (MQTT)-based messaging protocol, an Advanced Message Queuing Protocol (AMQP)-based messaging protocol, or a Message-Oriented Middleware (MOM)-based messaging framework.

The plurality of publisher nodes 610 associated with the MaaS network 604 may follow a standard or common communication protocol for data exchange. The plurality of publisher nodes 610 may be homogeneous publisher nodes that follow the MaaS standard specification for communication or may be heterogeneous publisher nodes that follow proprietary communication protocols. The MaaS network 604 may offer a plug-in-based support to the plurality of publisher nodes 610 so that such heterogeneous plurality of publisher nodes 610 can be supported until respective communication service providers adhere to and provide support for the MaaS standard specification for communication.

Each of the plurality of publisher nodes 610 may include suitable logic, circuitry, code, and/or interfaces that may be configured to transmit messages in response to one or more operations performed on at least one of the set of electronic devices 608. For example, messages may include trip-related data captured by at least one of the set of electronic devices 608. Such messages may be communicated to the plurality of subscriber nodes 614 of the MaaS network 604 through the message broker 612.

Each of the plurality of subscriber nodes 614 may include suitable logic, circuitry, code, and/or interfaces that may be configured to receive the messages, through the message broker 612, from the plurality of publisher nodes 610. Each message may include a topic which may be subscribed by one or more subscriber nodes of the plurality of subscriber nodes 614.

The message broker 612 may include suitable logic, circuitry, code, and/or interfaces that may be configured to route the messages from a publisher node (such as the first publisher node 610A) to a subscriber node (such as the first subscriber node 614A). Decisions to authorize the message broker 612 to route such messages to the plurality of subscriber nodes 614 may be determined by the server 618 associated with the MaaS network 604. Example implementations of the message broker 612 may include, but are not limited to, an application server, a cloud server, a mainframe server, a database server, a web server, or other type of servers.

The message broker 612 may be configured to communicate with each of the plurality of publisher nodes 610 and the plurality of subscriber nodes 614 through a suitable publish-subscribe network protocol, such as, but not limited to, a MQTT-based messaging protocol, an AMQP-based messaging protocol, or a MOM-based messaging framework.

Each node of the distributed ledger 616 may include suitable logic, circuitry, code, and/or interfaces that may be configured to record information in the messages that may be generated by the plurality of publisher nodes 610 for the plurality of subscriber nodes 614. Each node of the distributed ledger 616 may be a decentralized and distributed database system that may maintain an immutable record of data operations. A set of data operations may be grouped together as a block and may be further linked to a previous block of data operations to form a chain of a plurality of blocks. All blocks of data operations may be stored in a decentralized manner, in which at least two participants or nodes of each of the distributed ledger 616 may store a subset of the plurality of blocks associated with one or more transactions in which the at least two participants or nodes may participate. Further, the distributed ledger 616 may include an operating system (for example, a Java Virtual Machine (JVM)) which may allow deployment of a smart contract between multiple parties, for example, provider node(s) and a counter-party node (i.e., the MaaS provider node).

By way of example, and not limitation, the distributed ledger 616 may be a distributed ledger technology (DLT) system, such as a Blockchain based system (for example, a Corda® Blockchain, an Ethereum® Blockchain, or a Hyperledger® Blockchain). The distributed ledger 616 may store a set of immutable state objects that may be tracked by the distributed ledger 616. The state object may include a set of distributed ledger compatible rules for different types of distributed ledger technologies. For example, the state object may include transaction data, such as a smart contract between parties, a contract code, and content including state properties with certain state values. The smart contract may include a set of conditions under which multiple parties to the smart contract may agree to interact with each other. The smart contract may run on one or more nodes of the distributed ledger 616 and may govern transitions between state objects to generate a transaction. The smart contract may be written once, reused for a large numbers of state objects, and may refer to a governing legal prose by way of cryptographic hashes.

The distributed ledger 616 may use secure cryptographic hashes to identify parties and data and also to link a state object to a previous version of the state object to provide a chain of provenance. A transaction between a group of parties may be stored on the distributed ledger 616 such that only the group of parties associated with the transaction may be able to view the transaction. A party associated with a transaction may store a current state object of the transaction in a vault (a database associated with a respective distributed ledger, such as the distributed ledger 616). Another party eligible to view or process the transaction (e.g., validate the transaction) may retrieve the current state object of the transaction from the vault. Additionally, or alternatively, each state object of the distributed ledger 616 may include a smart contract between the parties or nodes that may participate in an associated transaction.

On each of the distributed ledger 616, a participant or a node (for example, the first ledger node 616A) may update a transaction by updating state properties of an input state object (for example, the first state object) to produce an output state object (for example, the second state object). The updated transaction may thereby create a chain of provenance (which may be associated with the transaction data). The distributed ledger 616 may provide a consensus for the updated transaction based on a determination of a validity of the updated transaction and a determination of a uniqueness of the updated transaction. In an embodiment, the participants of nodes associated with the updated transaction may determine the validity of the updated transaction by an independent execution of smart contracts and validation logic associated with the transaction.

Each of the plurality of MP servers 606 may include suitable logic, circuitry, interfaces, and or code that may be configured to collect log data from the set of electronic devices 608 and transmit the captured data to the system 602. For a MaaS application, each of the plurality of MP servers 606 may be owned and managed by a mobility or transportation service provider.

The server 618 may include suitable logic, circuitry, and interfaces, and/or code that may be configured to fulfil one or more services associated with the MaaS network 604. In an embodiment, the server 618 may include a pipeline that may be configured to fulfil one or more services associated with the MaaS network 604. The server 618 may be implemented as a virtual machine. In another embodiment, the server 618 may be implemented as a cloud server and may execute operations through web applications, cloud applications, HTTP requests, repository operations, file transfer, and the like. Other example implementations of the server 618 may include, but are not limited to, a database server, a file server, a web server, a media server, an application server, a mainframe server, or a cloud computing server.

In operation, the plurality of MP servers 606 may be configured to receive log data from the set of electronic devices 608. The plurality of MP servers 606 may be further configured to transmit the received log data to the system 602. The system 602 may determine the one or more security incidents associated with the set of electronic devices 608. Based on the one or more security incidents, the system 602 may be configured to determine a set of measures to be implemented on the set of electronic devices 608. The set of measures (i.e., the messages) may be transmitted to the plurality of publisher nodes 610 in the MaaS network 604. The plurality of publisher nodes 610 may be further configured to transmit the set of measures to the plurality of subscriber nodes 614 via the message broker 612. The plurality of subscriber nodes 614 may be configured to record the messages in the distributed ledger 616 and transmit the set of measures to the server 618. The server 618 may be configured to control the set of electronic devices 608 to execute the set of measures.

In an exemplary scenario, the malicious user 620 may attack the message broker 612 via the malicious device 622. In such a scenario, the first electronic device 106A of FIG. 1 may operate as the message broker 612 between the plurality of publisher nodes 610 and the plurality of subscriber nodes 614. The message broker 612 may be part of a network of devices that communicate in accordance with a publish-subscribe pattern. By way of example, and not limitation, the network of devices may correspond to the MaaS network 604 that includes the plurality of publisher nodes 610, the plurality of subscriber nodes 614, and the distributed ledger 616 associated with the plurality of subscriber nodes 614.

In an embodiment, the malicious user 620 may attack the message broker 612 of the MaaS network 604. The software plugin installed on the message broker 612 may capture log data associated with the message broker 612 and may share the captured log data with the system 102. The system 602 may be configured to prepare a feature set based on the log data and determine one or more security incidents associated with the message broker 612 based on at least one of an application of one or more incident detection rules on the feature set and/or an application of one or more ML models 110 on the feature set. In an embodiment, the determined one or more security incidents may correspond to a DDoS attack in which the message broker 612 may be flooded with connect requests from the malicious device 622. The system 102 may be configured to collect information associated with the DDoS attack on the message broker 612. Based on the collected information, the system 602 is further configured to block the connect requests before the connect requests reach the message broker 612 so as to prevent or mitigate issues associated with the one or more security incidents.

In another exemplary scenario, the malicious user 620 may attack a server or a set of servers that host the distributed ledger 616, via the malicious device 622. In such a scenario, the first electronic device 106A of FIG. 1 may be the server that hosts the distributed ledger 616 (i.e., part of the MaaS network 604).

Figure 7:
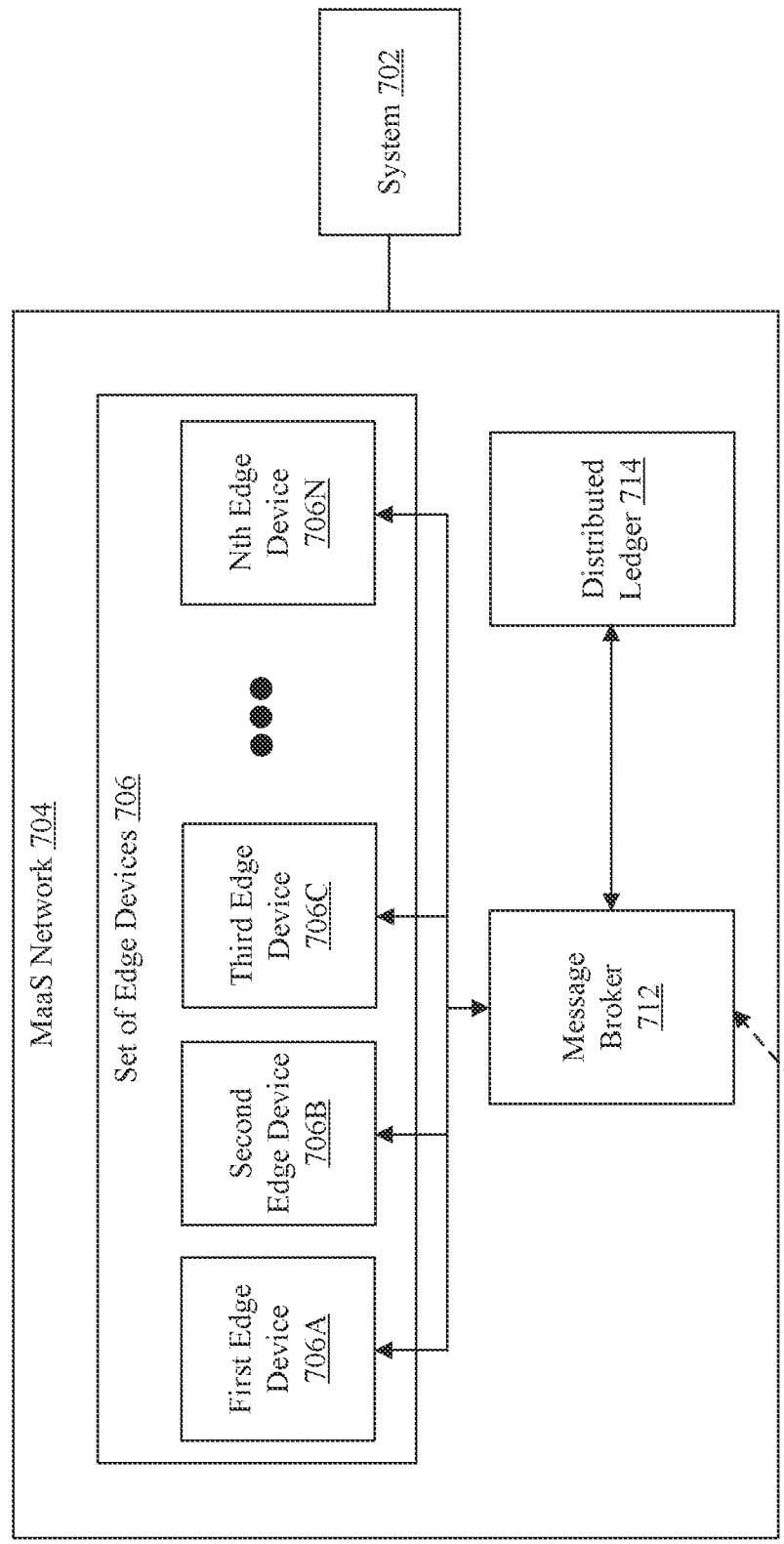
FIG. 7 is diagram that illustrates exemplary scenario for detection and mitigation (or prevention) of nested security incidents in a Mobility-as-a-Service (MaaS) network, in accordance with an embodiment of the disclosure.

FIG. 7 is diagram that illustrates exemplary scenario for detection and mitigation (or prevention) of nested security incidents in a Mobility-as-a-Service (MaaS) network, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown an exemplary network environment 700. The network environment 700 may include a system 702, a MaaS network 704, and a set of edge devices 706 associated with the MaaS network 704. The set of edge devices 706 may be an exemplary implementation of the set of electronic devices 106 of FIG. 1. There is further shown a malicious user 708 who may be associated with a malicious device 710.

In the exemplary scenario, the malicious user 708 may attack a message broker 712 of the MaaS network 704 via the malicious device 710. It may be assumed that such an attack may not be detected by the system 702. Using a targeted attack on the message broker 712, the malicious user 708 may gain access to the message broker 712 and the MaaS network 704. Once the malicious user 708 has access to or is inside the MaaS network 704, the malicious user 708 can perform various types of attack on the set of edge devices 706. The set of edge devices 706 may include, for example, a first edge device 706A, a second edge device 706B, a third edge device 706C, and an Nth edge device 706N.

In certain scenarios, the malicious user 708 may perform a different type of attack on each edge device of the set of edge devices 706. This may be done because each edge device 706 may not be vulnerable to just a single type of attack. For example, the malicious user 708 may perform attack of type 1 on the first edge device 706A, attack of type 2 on the second edge device 706B, attack of type 3 on the third edge device 706C, and attack of type N on the Nth edge device 706N. As another example, the malicious user 708 or attacker may launch a botnet-based attack to affect two of the edge or IoT devices. Other edge or IoT devices may not be affected by the attack as they have different configurations, or their vulnerabilities may have already been patched. In certain other scenarios, the malicious user 708 may perform nested attacks on each device of the set of edge devices 706. The attacks may be nested to attack the set of edge devices 706 after performing successful attacks on the message broker 712.

In cases where nested attacks are performed, the system 702 may be configured to acquire log data from each edge device of the set of edge devices 706. Based on the acquired log data, the system 702 may prepare a feature set that may correspond to one or more parameters associated with a cybersecurity of the corresponding edge device of the set of edge devices 706. The system 702 may determine one or more security incidents (or instances of security attacks) associated with each edge device based on the prepared feature set. Details about the determination of such incidents are provided, for example, in FIG. 4 and FIG. 5.

The system 702 may collect information associated with the determined one or more security incidents and determine a set of measures to be implemented on the corresponding edge device to mitigate or prevent issues associated with the determined one or more security incidents. Such measures may be determined based on the collected information. Thereafter, the system 702 may be configured to control execution of the determined set of measures on the corresponding edge device.

Figure 8:
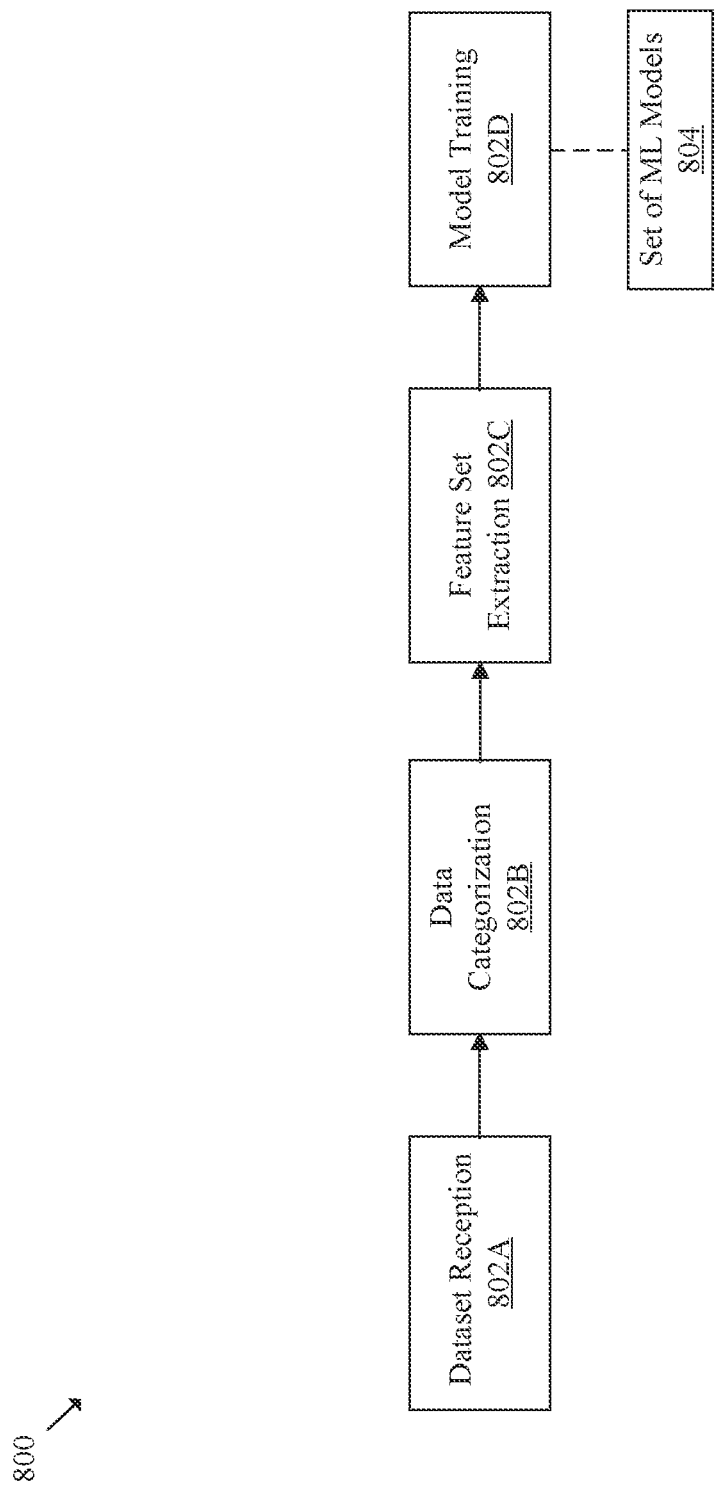
FIG. 8 is a diagram that illustrates exemplary operations for training of a set of ML models for enhancement of device security, in accordance with an embodiment of the disclosure.

FIG. 8 is a diagram that illustrates exemplary operations for training of a set of ML models for enhancement of device security, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown a block diagram 800 that illustrates exemplary operations from 802A to 802D, as described herein. The exemplary operations illustrated in the block diagram 800 may start at 802A and may be performed by any computing system, apparatus, or device, such as by the system 102 of FIG. 1 or circuitry 202 of FIG. 2. Although illustrated with discrete blocks, the exemplary operations associated with one or more blocks of the block diagram 800 may be divided into additional blocks, combined into fewer blocks, or eliminated, depending on the implementation.

At 802A, a dataset reception operation may be performed. In the dataset reception operation, the system 102 may be configured to receive one or more datasets associated with a plurality of security incidents. The one or more datasets may include a plurality of training samples. Each training sample may be associated with at least one security incident of the plurality of security incidents. The plurality of security incidents may correspond to at least one of a DoS attack, a DDoS attack, a malware attack, a botnet attack, a MitM attack, a crypto-mining attack, a firmware attack, a brute force attack, and a backdoor-based attack. Examples of one or more datasets may include, but are not limited to, a benign dataset, a CTU-13 Dataset, an Aposemat IoT-23, an End-game Malware Benchmark for Research (EMBER) dataset, an Australian defense force academy (ADFA) intrusion detection dataset, and a MAWIlab dataset.

At 802B, a data categorization operation may be performed. In the data categorization operation, the system 102 may be configured to categorize the plurality of training samples into a plurality of categories of data. The plurality of training samples may be categorized based on a type of security incident. For example, the plurality of training samples may be categorized into a first category of data associated with the DoS attack, a second category of data associated with the DDoS attack, a third category of data associated with the malware attack, a fourth category of data associated with the botnet attack, a fifth category of data associated with the MitM attack, a sixth category of data associated with the crypto-mining attack, a seventh category of data associated with the firmware attack, an eight category of data associated with the brute force attack, and a ninth category of data associated with the backdoor-based attack.

At 802C, a feature set extraction operation may be performed. In the feature set extraction operation, the system 102 may be configured to extract a plurality of feature sets. The extracted plurality of features may be associated with each of the plurality of categories of data. With reference to first example, the system 102 may be configured to extract a first feature set associated with the first category of data, a second feature set associated with the second category of data, a third feature set associated with the third category of data, a fourth feature set associated with the fourth category of data, a fifth feature set associated with the fifth category of data, a sixth feature set associated with the sixth category of data, a seventh feature set associated with the seventh category of data, an eight feature set associated with the eighth category of data, and a ninth feature set associated with the ninth category of data.

At 802D, a model training operation may be performed. In the model training operations, the system 102 may be configured to train a set of ML models 804 based on the plurality of features sets. Each of the set of ML models 804 may be trained on at least one feature set of the plurality of feature sets. In an embodiment, the set of ML models 804 may include the one or more ML models 110. Each ML model of the set of ML models may be trained to determine one or more security incidents associated with the first electronic device 106A and other devices inside or outside the IoT infrastructure 104. In an embodiment, the set of ML models 804 may be further trained to determine whether the security incident was a success or a failure. Specifically, the set of ML models 804 may be trained to determine whether the security of the first electronic device 106A has been breached or not.

Figure 9:
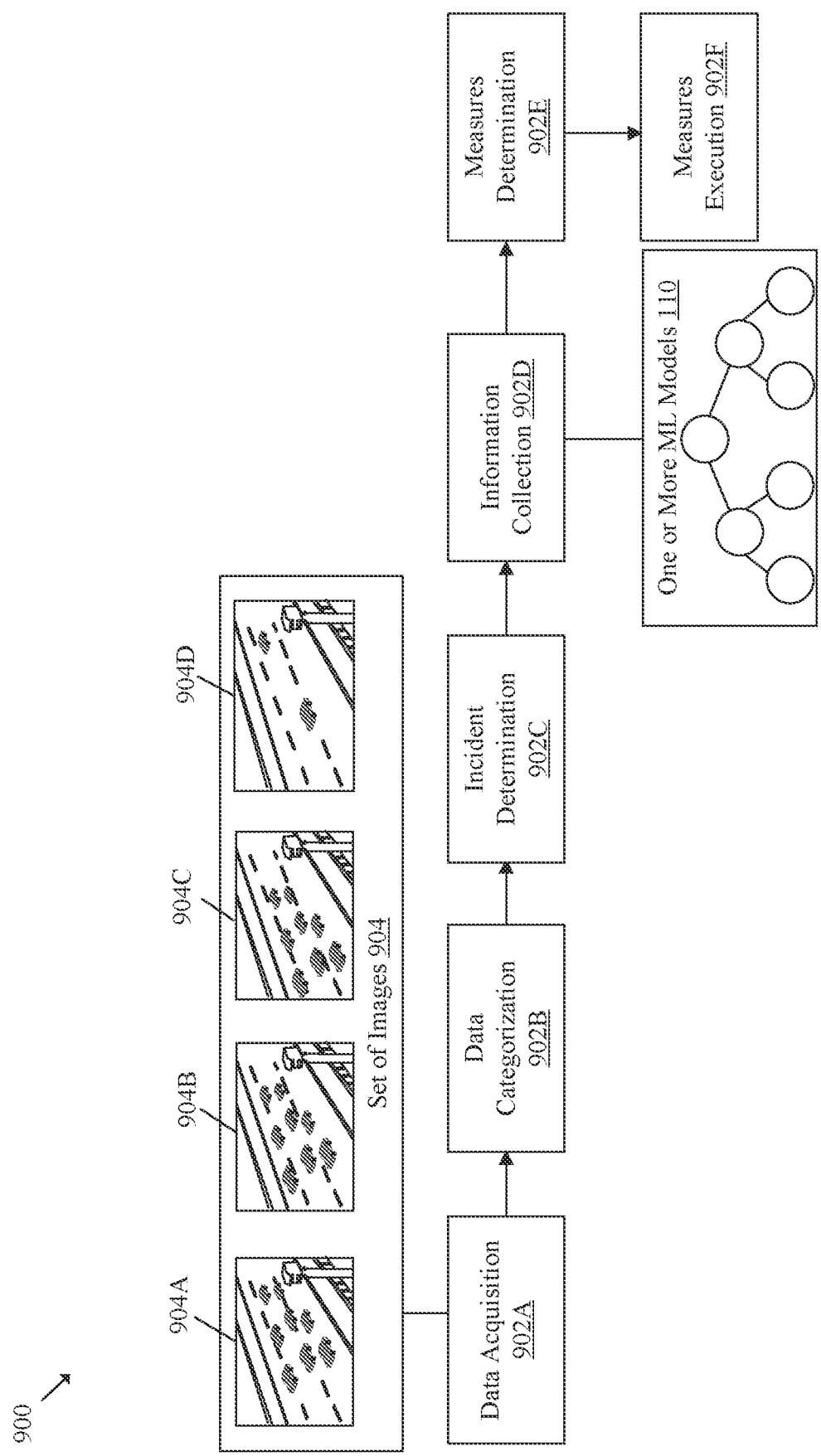
FIG. 9 is a diagram that illustrates exemplary operations associated for enhancement of security of a camera using machine learning and a set of rules, in accordance with an embodiment of the disclosure.

FIG. 9 is a diagram that illustrates exemplary operations associated for enhancement of security of a camera using machine learning and a set of rules, in accordance with an embodiment of the disclosure. FIG. 9 is explained in conjunction with elements from FIG. 1, FIG. 2, FIG. 3, FIG. 4, FIG. 5, FIG. 6, FIG. 7, and FIG. 8. With reference to FIG. 9, there is shown a block diagram 900 that illustrates exemplary operations from 902A to 902F, as described herein. The exemplary operations illustrated in the block diagram 900 may start at 902A and may be performed by any computing system, apparatus, or device, such as by the system 102 of FIG. 1 or circuitry 202 of FIG. 2. Although illustrated with discrete blocks, the exemplary operations associated with one or more blocks of the block diagram 900 may be divided into additional blocks, combined into fewer blocks, or eliminated, depending on the implementation.

In an embodiment, a camera (not shown) may be placed on a pole and may be configured to monitor traffic on a road. The camera may be an exemplary implementation of the electronic device. Specifically, the camera may be configured to detect and analyze traffic density at different periods of the day. In an exemplary scenario, due to a default/guessable password vulnerability in the camera, a malware may have been installed on the camera using a brute force attack by the malicious user 120. The malware executable may be downloaded from a malicious website and may be executed to corrupt data of traffic readings.

At 902A, a data acquisition operation may be performed. In the data acquisition operations, the system 102 may be configured to acquired log data from the camera. The log data may include sensor data stored on the camera, network logs associated with the camera, device logs associated with the camera, configuration files of the camera, and the like. As shown, for example, the sensor data includes a set of images 904 of one or more vehicles on the road. The set of images 904 includes a first image 904A, a second image 904B, a third image 904C, and a fourth image 904D. In an embodiment, the first image 904A, the second image 904B, the third image 904C may be captured by the camera before the installation of malware by the malicious user 120 on the camera and the fourth image 904D may be captured after the installation of the malware by the malicious user 120 on the camera.

At 902B, a data categorization operation may be performed. In the data categorization operation, the system 102 may be configured to perform one or more data cleaning operations to remove irrelevant data from the log data. After performing data filtering operations, the system 102 may be configured to categorize the data. Based on the categorization of the data, the system 102 may be configured to prepare a feature set. The feature set may be prepared based on the log data and may correspond to one or more parameters associated with a cybersecurity of the camera. In an embodiment, the one or more parameters may be selected by an administrator of the system 102 or the camera.

At 902C, an incident determination operation may be performed. In the incident determination operation, the system 102 may be configured to determine one or more security incidents associated with the camera. In an embodiment, the system 102 may be configured to apply one or more incident detection rules on the feature set. Based on the application of the one or more incident detection rules, the system 102 may determine a significant change in the sensor data with respect to expected sensor data. For example, if the normal traffic density from 8 AM to 9 AM on the road is 50 vehicles per mile (as shown in the first image 904A, the second image 904B, the third image 904C) and the sensor data indicates that the traffic density from 8 AM to 9 AM on the road is 2 vehicles per mile (as shown in the fourth image 904D), then the fourth image 904D may be considered as an outlier. Based on the application of the one or more incident detection rules, the system 102 may identify such an outlier. Based on the outlier, it may be determined that a potential cyberattack is currently underway to breach a security of the camera.

In order to ensure that there is no breach in the security of the camera, the system 102 may be configured to analyze the network logs associated with camera. For example, the analysis of the network logs may indicate that an executable file was downloaded on the camera from a website with malicious files. The system 102 may further analyze the device logs associated with the camera. The device logs may indicate that the camera executed the downloaded executable file. The execution may be different from an intended function of the camera, i.e. to capture the set of images 904. The system 102 may further determine the one or more security incidents based on analysis of such logs.

At 902D, an information collection operation may be performed. In the information collection operation, the system 102 may be configured to collect information associated with the determined one or more security incidents. Specifically, the system 102 may be configured to transmit a request to a software plugin installed on the camera. Based on the transmitted request, the system 102 may be configured to collect information associated with the determined one or more security incidents via the software plugin. The collected information may be associated with at least one of a type of each of the determined one or more security incidents, a port of the camera associated with the determined one or more security incidents, a time of occurrence of the determined one or more security incidents, an IP address associated with the determined one or more security incidents, one or more IP packets associated with the determined one or more security incidents, and additional information associated with the determined one or more security incidents. As an example, the additional information may include the executable file, details of the website with malicious files, a hash of the executable file, and the like.

At 902E, a measure determination operation may be performed. In the measures determination operation, the system 102 may be configured to determine a set of measures to be implemented on the camera to mitigate or prevent issues associated with the determined security incident. The set of measures may be determined based on the collected information.

At 902F, a measures execution operation may be performed. In the measures execution operation, the system 102 may be configured to control an execution of the determined set of measures on the camera. Specifically, the system 102 may be configured to control the execution of the determined set of measures on the camera using the software plugin installed on the camera.

It should be noted that during the time taken by the system 102 to perform the information collection operation (at 902D), the measure determination operation (at 902E), and the measure execution operation (at 902F), the system 102 may be configured to seize one or more functions performed by the camera and block all the communications associated with the camera. This may be done to prevent the spread of the malware to other devices associated with the camera.

Figure 10:
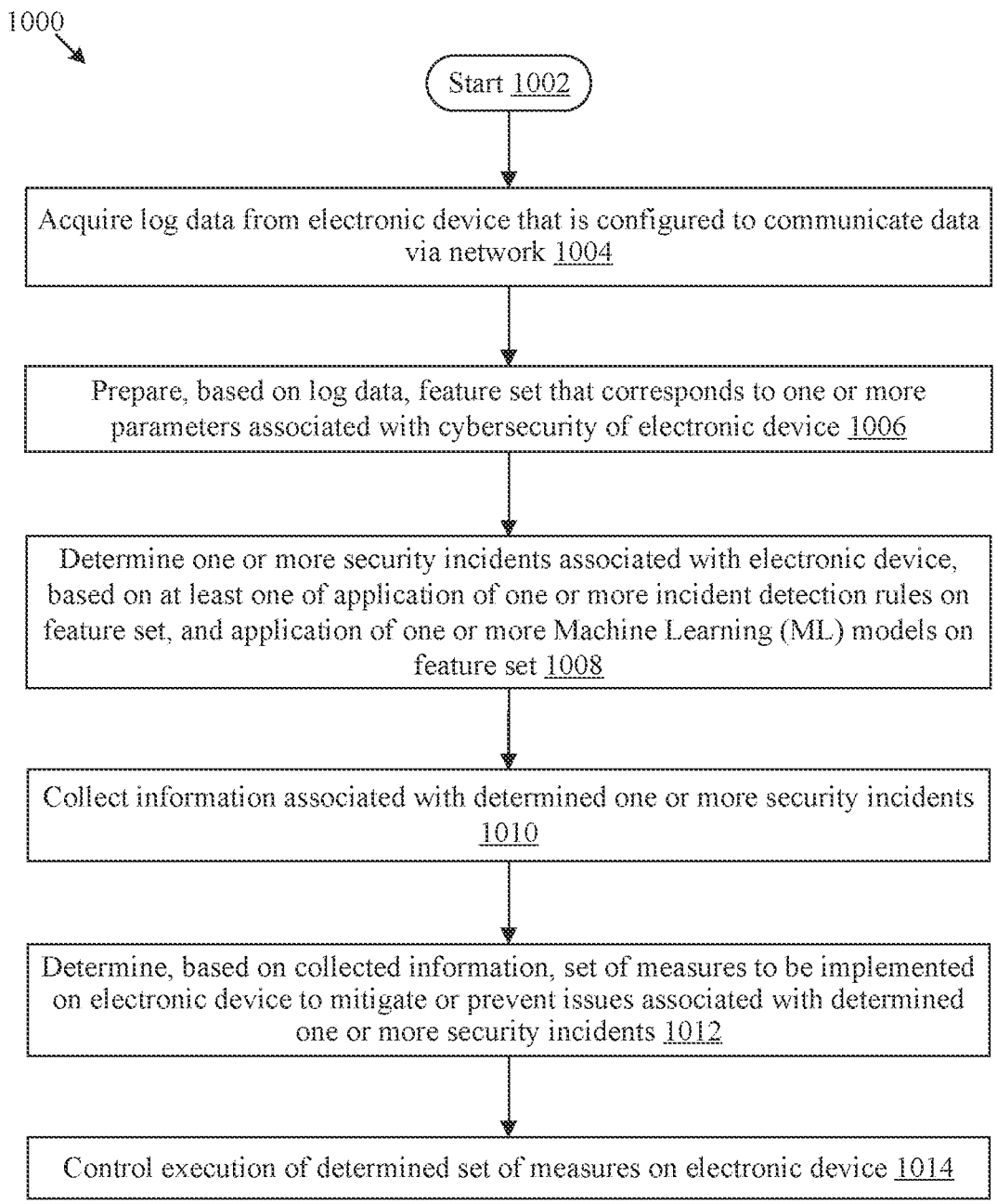
FIG. 10 is a flowchart that illustrates exemplary operations for enhancement of device security using machine learning and set of rules, in accordance with an embodiment of the disclosure.

FIG. 10 is a flowchart that illustrates exemplary operations for enhancement of device security using machine learning and set of rules, in accordance with an embodiment of the disclosure. FIG. 10 is explained in conjunction with elements from FIG. 1, FIG. 2, FIG. 3, FIG. 4, FIG. 5, FIG. 6, FIG. 7, FIG. 8, and FIG. 9. With reference to FIG. 10, there is shown a flowchart 1000. The operations from 1002 to 1014 may be implemented on any computing device, for example, the system 102 or the circuitry 202. The operations may start at 1002 and proceed to 1004.

At 1004, the log data 114 from the electronic device that may be configured to communicate data via the network 112 may be acquired. In one or more embodiments, the circuitry 202 may be configured to acquire the log data 114 from the electronic device that may be configured to communicate data via the network 112. Details about acquiring the log data are provided, for example, in FIGS. 1, 3, and 4.

At 1006, the feature set that corresponds to the one or more parameters associated with the cybersecurity of the electronic device may be prepared based on the log data. In one or more embodiments, the circuitry 202 may be configured to prepare, based on the log data, the feature set that corresponds to one or more parameters associated with the cybersecurity of the electronic device. Details about preparation of the feature set are provided, for example, in FIGS. 3, 4, and 5.

At 1008, one or more security incidents associated with the electronic device may be determined based on at least of an application of one or more incident detection rules on the feature set and an application of one or more ML models 110 on the feature set. In one or more embodiments, the circuitry 202 may be configured to determine one or more security incidents associated with the electronic device, based on at least one of an application of one or more incident detection rules on the feature set and an application of the one or more ML models 110 on the feature set. Details about preparation of the feature set are provided, for example, in FIGS. 3, 4, and 7.

At 1010, information associated with the determined one or more security incidents may be collected. In one or more embodiments, the circuitry 202 may be configured to collect information associated with the determined one or more security incidents. Details about collection of information are provided, for example, in FIG. 3 and FIG. 4.

At 1012, the set of measures be implemented on the electronic device to mitigate or prevent issues associated with the determined one or more security incidents may be determined based on the collected information. In one or more embodiments, the circuitry 202 may be configured to determine, based on the collected information, the set of measures to be implemented on the electronic device to mitigate or prevent issues associated with the determined one or more security incidents. Details about the set of measures are provided for example, in FIG. 4, and FIG. 9.

At 1014, an execution of the determined set of measures on the electronic device may be controlled. In one or more embodiments, the circuitry 202 may be configured to control the execution of the determined set of measures on the electronic device. Details about the execution of the set of measures are provided for example, in FIG. 3, FIG. 4, and FIG. 9. Control may pass to end.

Various embodiments of the disclosure may provide a non-transitory computer-readable medium and/or storage medium having stored thereon, computer-executable instructions executable by a machine and/or a computer such as the system 102. The computer-executable instructions may cause the machine and/or computer to perform operations that may include acquiring log data (such as the log data 114) from an electronic device (such as the first electronic device 106A) that is configured to communicate data via a network (such as the network 112). The operations may further include preparing a feature set that corresponds to one or more parameters associated with a cybersecurity of the electronic device based on the log data. The operations may further include determining one or more security incidents associated with the electronic device based on at least one of an application of one or more incident detection rules on the feature set, and an application of one or more Machine Learning (ML) models on the feature set. The operations may further include collect information associated with the determined one or more security incidents. The operations may further include determining a set of measures to be implemented on the electronic device to mitigate or prevent issues associated with the determined one or more security incidents based on the collected information. The operations may further include controlling an execution of the determined set of measures on the electronic device.

Exemplary aspects of the disclosure may include a system (such as the system 102 of FIG. 1) that may include circuitry (such as the circuitry 202). The circuitry may be configured to acquire log data (such as the log data 114) from an electronic device (such as the first electronic device 1]06A) that may be configured to communicate data via a network (such as the network 112). The log data may be received via a software plugin (such as the first software plugin 108A) on the electronic device. The log data may include at least one of sensor data stored on the electronic device, network logs associated with the electronic device, device logs associated with the electronic device, and configuration files of the electronic device. In an embodiment, the electronic device may be an Internet-of-things (IoT) device that may be part of an IoT infrastructure (such as the IoT infrastructure 104) and communicates via the network with devices inside or outside the IoT infrastructure.

In accordance with an embodiment, the system may be configured to receive an administrator input associated with the electronic device. The system may be further configured to select, from a network of devices, the electronic device to be used for extraction of the log data, based on the administrator input. The system may be further configured to refine the log data based on one or more preferences included in the administrator input, wherein the feature set is prepared by application of a feature extractor on the refined log data.

In accordance with an embodiment, the system may be configured to prepare a feature set that corresponds to one or more parameters associated with a cybersecurity of the electronic device based on the log data. The system may be further configured to extract a feature from the feature set. The system may be further configured to determine one or more security incidents associated with the electronic device based on at least one of an application of one or more incident detection rules on the feature set and an application of one or more Machine Learning (ML) models on the feature set. The one or more security incidents may correspond to at least one of a Denial of Services (DoS) attack, a Distributed Denial of Services (DDoS) attack, a malware attack, a botnet attack, a Man-in-the-Middle (MitM) attack, a crypto-mining attack, a firmware attack, a brute force attack, and a backdoor-based attack.

In accordance with an embodiment, the application of the one or more incident detection rules for the determination of the one or more security incidents includes a determination that the extracted feature matches one of a set of attack log rules included in the one or more incident detection rules.

In accordance with an embodiment, the system may be configured to extract a feature from the feature set. The system may be further configured to determine a feature selector that is associated with the extracted feature from training phase data. The system may be further configured to select one or more ML models (such as the one or more ML models 110) from among a set of ML models (such as the set of ML models 804), based on model performance criteria and the feature selector. The application of the one or more ML models on the feature set includes an operation to input the feature set to the one or more ML models and an operation to extract a classification result as output of the one or more ML models. The classification result may indicate whether the one or more security incidents have occurred or are about to occur on the electronic device.

In accordance with an embodiment, the system may be configured to collect information associated with the determined one or more security incidents. The collected information is associated with at least one of a type of each of the one or more security incidents, a port of the electronic device associated with the one or more security incidents, a time of occurrence of the one or more security incidents, an Internet protocol (IP) address associated with the one or more security incidents, and one or more IP packets associated with the one or more security incidents. The system 102 may be further configured to determine a set of measures to be implemented on the electronic device to mitigate or prevent issues associated with the determined one or more security incidents based on the collected information. The set of measures correspond to installation of a vulnerability patch on the electronic device. The system may be further configured to control an execution of the determined set of measures on the electronic device.

In accordance with an embodiment, the system may be configured to receive one or more datasets associated with a plurality of security incidents. The one or more datasets include a plurality of training samples. The system may be configured to categorize the plurality of training samples into a plurality of categories of data based on a type of security incident. The system may be configured to extract a plurality of feature sets associated with each of the plurality of categories of data. The system may be configured to train a set of ML models based on the plurality of features sets, wherein the one or more ML models are part of the trained set of ML models.

In accordance with an embodiment, the system may be configured to control the electronic device to execute one or more vulnerability scans on the electronic device. The one or more vulnerability scans may be executed based on a determination that the one or more security incidents indicate that a cyberattack performed by a malicious node failed to breach a security of the electronic device. The system may be configured to receive vulnerability scan results based on the execution of the one or more vulnerability scans on the electronic device. The system may be configured to determine a set of security checks to be performed on the electronic device based on at least one of the received vulnerability scan results, a security intelligence database, and one or more policies associated with the system or the electronic device. The system 102 may be configured to control the electronic device to execute a set of security checks on the electronic device to prevent the one or more security incidents.

In accordance with an embodiment, the set of security checks may be associated with at least one of a software associated with the electronic device, one or more ports associated with the electronic device, and credentials associated with the electronic device.

In accordance with an embodiment, the electronic device may be a message broker (such as the message broker 612) that may be part of a network of devices that communicate in accordance with a publish-subscribe pattern. In accordance with another embodiment, the electronic device hosts a distributed ledger that as part of a Mobility-as-a-Service (MaaS) network (such as the MaaS network 604).

In accordance with an embodiment, the network of devices may correspond to a Mobility-as-a-Service (MaaS) network that includes a plurality of publisher nodes, a plurality of subscriber nodes, a distributed ledger associated with the plurality of subscriber nodes, and the electronic device operates as a message broker between the plurality of publisher nodes and the plurality of subscriber nodes, wherein the one or more security incidents correspond to a Distributed Denial of Services (DDoS) attack in which the message broker is flooded with connect requests from a malicious device. In accordance with an embodiment, the system may be configured to block the connect requests before the connect requests reach the message broker so as to prevent the one or more security incidents.

In accordance with an embodiment, the electronic device is an edge device that is part of an edge computing infrastructure.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
circuitry configured to:
acquire log data from an electronic device via a network;
prepare, based on the log data, a feature set that corresponds to one or more parameters associated with cybersecurity of the electronic device;
apply one or more Machine Learning (ML) models on the feature set, wherein
the application of the one or more ML models includes an operation to input the feature set to the one or more ML models, and an operation to extract a classification result as an output of the one or more ML models, and
the classification result indicates one of:
one or more security incidents have occurred on the electronic device, or
the one or more security incidents are about to occur on the electronic device;

control, in a case where the classification result indicates that the one or more security incidents are about to occur on the electronic device, the electronic device to execute one or more vulnerability scans on the electronic device;

collect, in a case where the classification result indicates that the one or more security incidents have occurred on the electronic device, information associated with the one or more security incidents;

determine, based on the collected information, a set of measures for the electronic device to mitigate issues associated with the one or more security incidents; and control the electronic device to execute the determined set of measures on the electronic device.

2. The system according to claim 1, wherein
the electronic device is an Internet-of-things (IoT) device that is part of an IoT infrastructure, and
the electronic device communicates via the network with devices that are one of inside or outside the IoT infrastructure.

3. The system according to claim 1, wherein the log data comprises at least one of sensor data stored on the electronic device, network logs associated with the electronic device, device logs associated with the electronic device, or configuration files of the electronic device.

4. The system according to claim 1, wherein the circuitry is further configured to acquire the log data via a software plugin on the electronic device.

5. The system according to claim 1, wherein the circuitry is further configured to:
receive an administrator input of an administrator associated with the electronic device, wherein
the administrator input includes one or more preferences of the administrator;
select, from a network of devices, the electronic device for extraction of the log data, wherein
the selection is based on the administrator input;
refine the log data based on the one or more preferences; and
prepare the feature set by application of a feature extractor on the refined log data.

6. The system according to claim 1, wherein the circuitry is further configured to:
extract a feature from the feature set; and
determine the one or more security incidents by application of one or more incident detection rules on the extracted feature, wherein
the one or more incident detection rules include a set of attack log rules, and
the application of the one or more incident detection rules includes a determination that the extracted feature matches one attack log rule of the set of attack log rules.

7. The system according to claim 1, wherein the circuitry is further configured to:
extract a feature from the feature set;
determine, from training phase data, a feature selector that is associated with the extracted feature; and
select the one or more ML models from among a set of ML models, based on model performance criteria and the feature selector.

8. The system according to claim 1, wherein the circuitry is further configured to:
receive one or more datasets associated with a plurality of security incidents, wherein
the plurality of security incidents includes the one or more security incidents, and
the one or more datasets include a plurality of training samples;
categorize the plurality of training samples into a plurality of categories of data, based on a type of each security incident of the plurality of security incidents;
extract a plurality of feature sets associated with the plurality of categories of data, wherein
the plurality of feature sets includes the feature set; and
train a set of ML models based on the plurality of feature sets, wherein
the trained set of ML models includes the one or more ML models.

9. The system according to claim 1, wherein
the one or more security incidents indicate that a cyber-attack by a malicious node failed to breach a security of the electronic device, and
the circuitry is further configured to:
receive vulnerability scan results based on the execution of the one or more vulnerability scans on the electronic device;
determine a set of security checks for the electronic device based on at least one of:
the received vulnerability scan results,
a security intelligence database, or
one or more policies associated with at least one of the system or
the electronic device; and
control the electronic device to execute the set of security checks on the electronic device to prevent the one or more security incidents.

10. The system according to claim 9, wherein the set of security checks is associated with at least one of:
a software associated with the electronic device,
one or more ports associated with the electronic device, or
credentials associated with the electronic device.

11. The system according to claim 1, wherein the collected information is associated with at least one of:
a type of each security incident of the one or more security incidents,
a port of the electronic device associated with the one or more security incidents,
a time of occurrence of the one or more security incidents,
an Internet protocol (IP) address associated with the one or more security incidents, or
one or more IP packets associated with the one or more security incidents.

12. The system according to claim 1, wherein the set of measures corresponds to installation of a vulnerability patch on the electronic device.

13. The system according to claim 1, wherein the one or more security incidents correspond to at least one of:
a Denial of Services (DOS) attack,
a Distributed Denial of Services (DDOS) attack,
a malware attack,
a botnet attack,
a Man-in-the-Middle (MitM) attack,
a crypto-mining attack,
a firmware attack,
a brute force attack, or
a backdoor-based attack.

14. The system according to claim 1, wherein
the electronic device is a message broker that is part of a network of devices, and the electronic device communicates with at least one device of the network of devices based on a publish-subscribe pattern.

15. The system according to claim 1, wherein the electronic device hosts a distributed ledger that is part of a Mobility-as-a-Service (MaaS) network.

16. The system according to claim 14, wherein
the network of devices corresponds to a Mobility-as-a-Service (MaaS) network that includes a plurality of publisher nodes, a plurality of subscriber nodes, and a distributed ledger associated with the plurality of subscriber nodes,
the electronic device operates as the message broker between the plurality of publisher nodes and the plurality of subscriber nodes, and
the one or more security incidents correspond to a Distributed Denial of Services (DDOS) attack in which the message broker is flooded with connect requests from a malicious device.

17. The system according to claim 16, wherein the circuitry is further configured to block the connect requests before the connect requests reach the message broker, to prevent the one or more security incidents.

18. The system according to claim 1, wherein the electronic device is an edge device that is part of an edge computing infrastructure.

19. A method, comprising:
acquiring log data from an electronic device via a network;
preparing, based on the log data, a feature set that corresponds to one or more parameters associated with cybersecurity of the electronic device;
applying one or more Machine Learning (ML) models on the feature set, wherein
the application of the one or more ML models includes an operation to input the feature set to the one or more ML models, and an operation to extract a classification result as an output of the one or more ML models, and
the classification result indicates one of:
one or more security incidents have occurred on the electronic device, or
the one or more security incidents are about to occur on the electronic device;
controlling, in a case where the classification result indicates that the one or more security incidents are about to occur on the electronic device, the electronic device to execute one or more vulnerability scans on the electronic device;
collecting, in a case where the classification result indicates that the one or more security incidents have occurred on the electronic device, information associated with the one or more security incidents;
determining, based on the collected information, a set of measures for the electronic device to mitigate issues associated with the one or more security incidents; and
controlling the electronic device to execute the determined set of measures on the electronic device.

20. A non-transitory computer-readable medium having stored thereon computer-executable instructions that, when executed by a processor of a system, cause the processor to execute operations, the operations comprising:
acquiring log data from an electronic device via a network;
preparing, based on the log data, a feature set that corresponds to one or more parameters associated with cybersecurity of the electronic device;
applying one or more Machine Learning (ML) models on the feature set, wherein
the application of the one or more ML models includes an operation to input the feature set to the one or more ML models, and an operation to extract a classification result as an output of the one or more ML models, and
the classification result indicates one of:
one or more security incidents have occurred on the electronic device, or
the one or more security incidents are about to occur on the electronic device;
controlling, in a case where the classification result indicates that the one or more security incidents are about to occur on the electronic device, the electronic device to execute one or more vulnerability scans on the electronic device;
collecting, in a case where the classification result indicates that the one or more security incidents have occurred on the electronic device, information associated with the one or more security incidents;
determining, based on the collected information, a set of measures for the electronic device to mitigate issues associated with the one or more security incidents; and
controlling the electronic device to execute the determined set of measures on the electronic device.

* * * * *